US006857569B1

(12) United States Patent
Smith, Sr. et al.

(10) Patent No.: US 6,857,569 B1
(45) Date of Patent: Feb. 22, 2005

(54) DATA STORAGE CARD HAVING A NON-MAGNETIC SUBSTRATE AND DATA SURFACE REGION AND METHOD FOR USING SAME

(75) Inventors: Malcolm G. Smith, Sr., Mulege (MX); Donald C. Mann, Thousand Oaks, CA (US)

(73) Assignee: UltraCard, Inc., Bend, OR (US)

( * ) Notice: Subject to any disclaimer, the term of this patent is extended or adjusted under 35 U.S.C. 154(b) by 73 days.

(21) Appl. No.: 09/663,659

(22) Filed: Sep. 15, 2000

Related U.S. Application Data

(63) Continuation-in-part of application No. 09/113,783, filed on Jul. 10, 1998, now Pat. No. 6,131,816, which is a continuation of application No. 09/105,696, filed on Jun. 26, 1998, now abandoned, which is a continuation-in-part of application No. 07/871,447, filed on Apr. 21, 1992, now abandoned, which is a continuation-in-part of application No. 07/342,217, filed on Apr. 24, 1989, now Pat. No. 5,107,099.

(51) Int. Cl.[7] .......................... G06K 7/08; G06K 13/00; G06K 7/00; G06K 19/06
(52) U.S. Cl. ...................... 235/449; 235/475; 235/477; 235/486; 235/493
(58) Field of Search ................................ 235/449, 475, 235/477, 486, 493, 439, 487

(56) References Cited

U.S. PATENT DOCUMENTS

| | | | |
|---|---|---|---|
| 1,756,547 A | | 4/1930 | Hansen |
| 3,677,843 A | | 7/1972 | Reiss |
| 3,838,252 A | | 9/1974 | Hynes et al. |
| 3,864,755 A | | 2/1975 | Hargis |
| 4,006,507 A | * | 2/1977 | Yoshida ...................... 15/102 |
| 4,058,839 A | | 11/1977 | Darjany |
| 4,076,125 A | | 2/1978 | Ohsaki et al. |
| 4,100,689 A | | 7/1978 | Broune |
| 4,104,682 A | | 8/1978 | Lehner et al. |
| 4,141,400 A | | 2/1979 | Mangan |
| 4,197,988 A | | 4/1980 | Moss et al. |
| 4,209,811 A | | 6/1980 | Blazevic |
| 4,277,809 A | | 7/1981 | Fisher et al. |
| 4,302,523 A | | 11/1981 | Audran et al. |
| 4,318,136 A | | 3/1982 | Jeffers |

(List continued on next page.)

FOREIGN PATENT DOCUMENTS

| | | |
|---|---|---|
| EP | 0194675 | 9/1986 |
| FR | 2505523 | 12/1982 |
| JP | 10041118 | 4/1998 |
| JP | 10144391 A | 5/1998 |
| WO | WO9210485 | 12/1992 |

OTHER PUBLICATIONS (One Page) Advertising Brochure, Iomega Clik! PC Card Drive (40 MB Disk) Iomega Corporation, 1999.

(List continued on next page.)

Primary Examiner—Karl D. Frech
Assistant Examiner—April Taylor
(74) Attorney, Agent, or Firm—Bever, Hoffman & Harms, LLP

(57) ABSTRACT

A data storage card includes a glass substrate having first and second edges. A data storage surface region is located on the glass substrate between the first and second edges. The data surface region includes a magnetic storage medium having at least one layer of high density, high coercivity magnetic material for storing magnetic signals. The data storage card may include a relatively hard, abradeable protective coating formed on the magnetic material layer. The protective coating has a thickness between a maximum thickness which would materially attenuate magnetic signals passing between the magnetic material layer and a transducer of a read device, and a minimum thickness enabling said protective coating to be abraded by usage in an ambient natural atmosphere operating environment for removing therefrom a known quantity of the protective coating.

20 Claims, 10 Drawing Sheets

U.S. PATENT DOCUMENTS

| | | | |
|---|---|---|---|
| D264,853 S | 6/1982 | Scavino et al. | |
| 4,403,138 A | 9/1983 | Battarel et al. | |
| 4,450,955 A | 5/1984 | Featherston | |
| 4,503,125 A | 3/1985 | Nelson et al. | |
| 4,518,627 A | 5/1985 | Foley et al. | |
| 4,530,016 A | 7/1985 | Sawazaki | |
| 4,535,369 A | 8/1985 | Sawazaki | |
| 4,581,523 A | 4/1986 | Okuno | |
| 4,585,929 A | 4/1986 | Brown et al. | |
| 4,592,042 A | 5/1986 | Lemelson et al. | |
| 4,598,196 A | 7/1986 | Pierce et al. | |
| 4,609,812 A | 9/1986 | Drexler | |
| 4,612,436 A | 9/1986 | Okada | |
| 4,620,727 A | 11/1986 | Stockburger et al. | |
| 4,659,915 A | 4/1987 | Flies | |
| 4,672,182 A | 6/1987 | Hirokawa | |
| 4,683,371 A | 7/1987 | Drexler | |
| 4,687,712 A | 8/1987 | Sugita et al. | |
| 4,701,601 A | 10/1987 | Francini et al. | |
| 4,707,593 A | 11/1987 | Murata et al. | |
| D293,694 S | 1/1988 | Alden et al. | |
| 4,718,697 A | 1/1988 | Berardus van Amelsfort | |
| 4,731,645 A | 3/1988 | Parmentier et al. | |
| 4,754,128 A | 6/1988 | Takeda et al. | |
| 4,756,967 A | 7/1988 | Hashimoto et al. | |
| 4,774,618 A | 9/1988 | Raviv | |
| 4,777,540 A | 10/1988 | McCoy | |
| 4,780,604 A | 10/1988 | Hasegawa et al. | |
| 4,786,564 A | 11/1988 | Chen et al. | |
| 4,791,283 A | 12/1988 | Burkhardt | |
| 4,812,633 A | 3/1989 | Vogelgesang et al. | |
| 4,826,772 A | 5/1989 | Meathrel | |
| 4,833,310 A | 5/1989 | Shimamura et al. | |
| 4,851,610 A | 7/1989 | LeBlanc et al. | |
| 4,868,373 A | 9/1989 | Opheij et al. | |
| 4,877,488 A | 10/1989 | Cody et al. | |
| 4,889,755 A | 12/1989 | Charbonneau | |
| 4,897,533 A | 1/1990 | Lyszczarz | |
| D305,887 S | 2/1990 | Nishimura | |
| 4,931,623 A | 6/1990 | Nakamura et al. | |
| 4,937,438 A | 6/1990 | Warwick et al. | |
| 4,978,401 A | 12/1990 | Bonomi | |
| 4,998,009 A | 3/1991 | Iijima et al. | |
| 5,008,552 A * | 4/1991 | Kuramochi et al. | 235/483 |
| 5,036,430 A | 7/1991 | Hills | |
| 5,041,922 A | 8/1991 | Wood et al. | |
| 5,049,728 A | 9/1991 | Rovin | |
| 5,055,155 A | 10/1991 | Crotty et al. | |
| 5,099,111 A | 3/1992 | Takakura et al. | |
| 5,099,372 A * | 3/1992 | Kadokura et al. | 360/99.01 |
| 5,101,097 A | 3/1992 | Conant | |
| 5,107,099 A | 4/1992 | Smith | |
| D328,457 S | 8/1992 | Matsuzaka | |
| 5,147,732 A * | 9/1992 | Shiroishi et al. | 428/668 |
| 5,172,282 A | 12/1992 | Ghose | |
| 5,180,640 A | 1/1993 | Yamashita et al. | |
| 5,191,198 A | 3/1993 | Do | |
| 5,204,513 A | 4/1993 | Steele | |
| 5,206,489 A | 4/1993 | Warwick | |
| 5,206,494 A | 4/1993 | Metzger | |
| 5,217,056 A | 6/1993 | Ritter | |
| 5,221,838 A | 6/1993 | Gutman et al. | |
| 5,227,212 A | 7/1993 | Ahlert et al. | |
| 5,236,791 A * | 8/1993 | Yahisa et al. | 428/694 TP |
| 5,254,843 A | 10/1993 | Hynes et al. | |
| 5,270,523 A | 12/1993 | Chang et al. | |
| 5,286,958 A | 2/1994 | Smeets | |
| 5,288,942 A | 2/1994 | Godfrey | |
| 5,309,388 A | 5/1994 | Maruyama et al. | |
| 5,311,003 A | 5/1994 | Saroya | |
| 5,321,243 A | 6/1994 | Groves et al. | |
| 5,336,871 A | 8/1994 | Colgate, Jr. | |
| 5,362,952 A | 11/1994 | Nair et al. | |
| 5,396,369 A | 3/1995 | Deland, Jr. et al. | |
| 5,396,545 A | 3/1995 | Nair et al. | |
| 5,397,886 A | 3/1995 | Mos et al. | |
| 5,408,384 A | 4/1995 | Gannyo et al. | |
| 5,410,136 A | 4/1995 | McIntire et al. | |
| 5,421,618 A | 6/1995 | Okazaki et al. | |
| 5,426,286 A | 6/1995 | Nair et al. | |
| 5,428,213 A * | 6/1995 | Kurihara | 235/475 |
| 5,431,746 A | 7/1995 | Manning et al. | |
| 5,452,143 A | 9/1995 | Kamagami | |
| 5,466,918 A | 11/1995 | Ray et al. | |
| 5,480,685 A | 1/1996 | Suzuki et al. | |
| 5,492,745 A * | 2/1996 | Yokoyama | 428/65.3 |
| 5,509,083 A | 4/1996 | Abtahi et al. | |
| 5,521,774 A | 5/1996 | Parks et al. | |
| 5,530,232 A | 6/1996 | Taylor | |
| 5,535,078 A | 7/1996 | Warwick | |
| 5,557,089 A | 9/1996 | Hall et al. | |
| 5,559,885 A | 9/1996 | Drexler et al. | |
| 5,588,763 A | 12/1996 | Nubson et al. | |
| 5,598,474 A | 1/1997 | Johnson | |
| 5,609,253 A | 3/1997 | Goade, Sr. | |
| 5,612,526 A | 3/1997 | Oguchi et al. | |
| 5,621,583 A | 4/1997 | Parks et al. | |
| 5,626,970 A * | 5/1997 | Hedgcoth | 428/611 |
| 5,637,174 A | 6/1997 | Field et al. | |
| 5,638,345 A | 6/1997 | Hosoya | |
| 5,679,942 A | 10/1997 | Toyama | |
| 5,679,945 A | 10/1997 | Renner et al. | |
| 5,689,105 A | 11/1997 | Mizoguchi et al. | |
| 5,696,369 A | 12/1997 | Watanabe | |
| 5,698,839 A | 12/1997 | Jagielinski | |
| 5,713,406 A | 2/1998 | Drury | |
| 5,714,747 A | 2/1998 | West et al. | |
| 5,720,500 A * | 2/1998 | Okazaki et al. | 283/82 |
| 5,723,033 A | 3/1998 | Weiss | |
| 5,734,154 A | 3/1998 | Jachimowicz et al. | |
| 5,738,945 A | 4/1998 | Lal et al. | |
| 5,739,975 A | 4/1998 | Parks et al. | |
| 5,748,737 A | 5/1998 | Daggar | |
| 5,756,220 A | 5/1998 | Hoshino et al. | |
| 5,763,862 A | 6/1998 | Jachimowicz et al. | |
| 5,770,942 A | 6/1998 | Taguchi | |
| 5,777,306 A | 7/1998 | Masuda | |
| 5,789,733 A | 8/1998 | Jachimowicz et al. | |
| 5,801,368 A | 9/1998 | Hayashi et al. | |
| 5,808,981 A * | 9/1998 | Suzuki | 369/44.28 |
| 5,825,393 A | 10/1998 | Kocznar et al. | |
| 5,828,053 A | 10/1998 | Kinugasa | |
| 5,834,756 A | 11/1998 | Gutman et al. | |
| 5,843,565 A | 12/1998 | Davies et al. | |
| 5,844,218 A | 12/1998 | Kawan et al. | |
| 5,844,230 A | 12/1998 | Lalonde | |
| 5,851,688 A | 12/1998 | Chen et al. | |
| 5,852,289 A | 12/1998 | Masahiko | |
| 5,857,079 A | 1/1999 | Claus et al. | |
| 5,859,419 A | 1/1999 | Wynn | |
| 5,861,220 A | 1/1999 | Coughlin | |
| 5,862,174 A | 1/1999 | Yokota et al. | |
| 5,866,891 A | 2/1999 | Fujimoto et al. | |
| 5,869,823 A | 2/1999 | Bublitz et al. | |
| 5,880,445 A | 3/1999 | Mori et al. | |
| 5,880,454 A | 3/1999 | Monicault | |
| 5,883,377 A | 3/1999 | Chapin, Jr. | |
| 5,884,271 A | 3/1999 | Pitroda | |
| 5,886,333 A | 3/1999 | Miyake | |
| 5,889,273 A | 3/1999 | Goto | |
| D408,377 S | 4/1999 | Ferchau et al. | |

| | | | |
|---|---|---|---|
| 5,895,903 A | | 4/1999 | Abe et al. |
| 5,895,909 A | | 4/1999 | Yoshida |
| 5,898,612 A | | 4/1999 | Chen et al. |
| 5,901,012 A | | 5/1999 | Ishida |
| 5,901,303 A | | 5/1999 | Chew |
| D410,769 S | | 6/1999 | Dorizas |
| 5,928,759 A | * | 7/1999 | Arita et al. ............... 428/141 |
| 5,939,202 A | * | 8/1999 | Ataka et al. ............... 428/457 |
| 5,941,375 A | | 8/1999 | Kamens et al. |
| 5,979,774 A | | 11/1999 | Urushibata |
| 5,997,042 A | | 12/1999 | Blank |
| 6,053,406 A | * | 4/2000 | Litman ................ 235/449 |
| D425,876 S | | 5/2000 | Maiers et al. |
| 6,079,621 A | | 6/2000 | Vardanyan et al. |
| 6,080,476 A | * | 6/2000 | Kanbe et al. ............ 428/332 |
| D429,733 S | | 8/2000 | Jones et al. |
| 6,116,655 A | | 9/2000 | Thouin et al. |
| 6,131,816 A | | 10/2000 | Smith, Sr. |
| D436,991 S | | 1/2001 | Morgante |
| 6,186,398 B1 | * | 2/2001 | Kato et al. ............... 235/449 |
| 6,196,047 B1 | | 3/2001 | Carnegie et al. |
| 6,221,508 B1 | * | 4/2001 | Kanbe et al. ............ 428/617 |
| 6,238,809 B1 | * | 5/2001 | Wu et al. ............ 428/694 TS |
| 6,250,552 B1 | * | 6/2001 | Hirasawa ................ 235/475 |
| 6,254,713 B1 | | 7/2001 | Riehle |
| 6,268,919 B1 | | 7/2001 | Meeks et al. |
| D447,146 S | | 8/2001 | Myers |
| D448,776 S | | 10/2001 | Weng et al. |
| 6,301,068 B1 | | 10/2001 | Ionescu |
| 6,311,893 B1 | | 11/2001 | Liu et al. |
| 6,378,037 B1 | | 4/2002 | Hall |
| 6,398,114 B1 | | 6/2002 | Nishikawa et al. |
| 6,430,114 B1 | | 8/2002 | Wang et al. |
| 6,677,105 B2 | | 1/2004 | Wang et al. |

OTHER PUBLICATIONS

Gooch et al. "A High Resolution Flying Magnetic Disk Recording System With Zero Reproduce Spacing Loss" pp. 4545–4554, IEEE Transactions on Magnetis, vol. 27, No. 6, Nov. 1991.

One (1) Page Advertising Brochure, SysTECH, Wallet Size CDROM, Copyright 1999.

Three (3) Pages / Gold CD Mini ROM (Picture), Back/Front Packaging for CD Mini ROM AOL, America On Line.

Bhushan, Bharat, *Tribology and Mechanics of Magnetic Storage Devices*, New York: Springer–Verlag, pp. 599, 629–638.

* cited by examiner

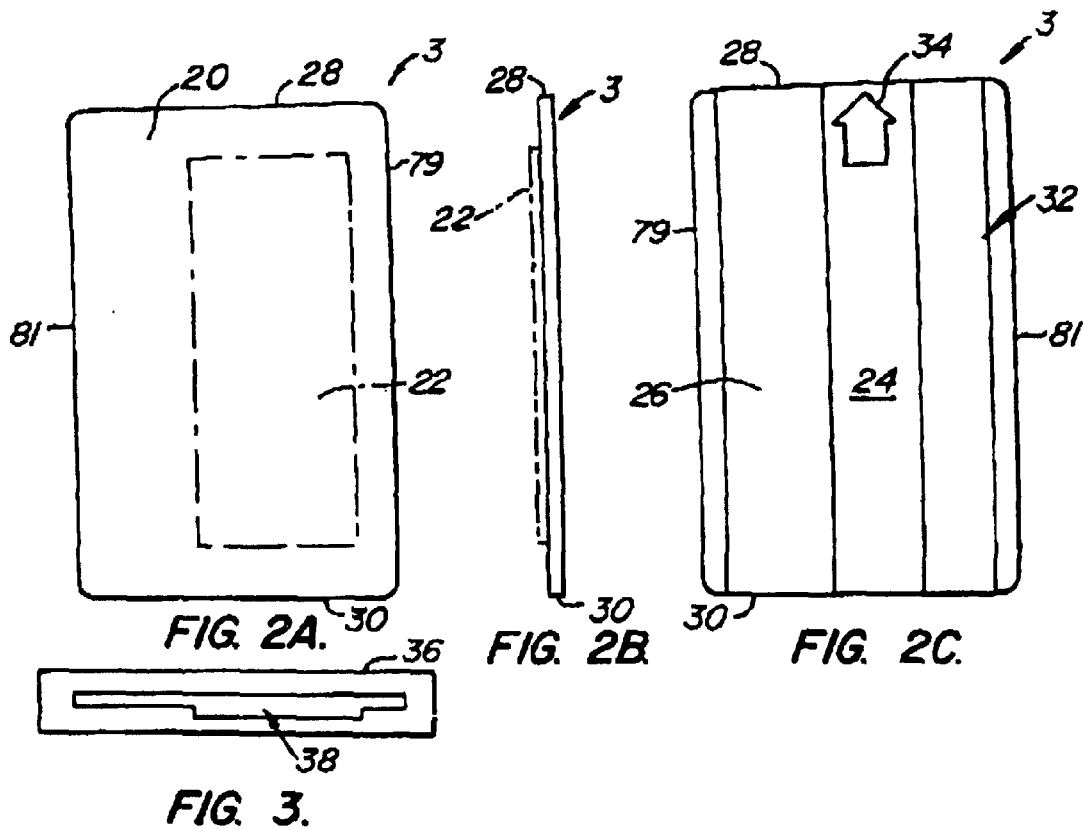
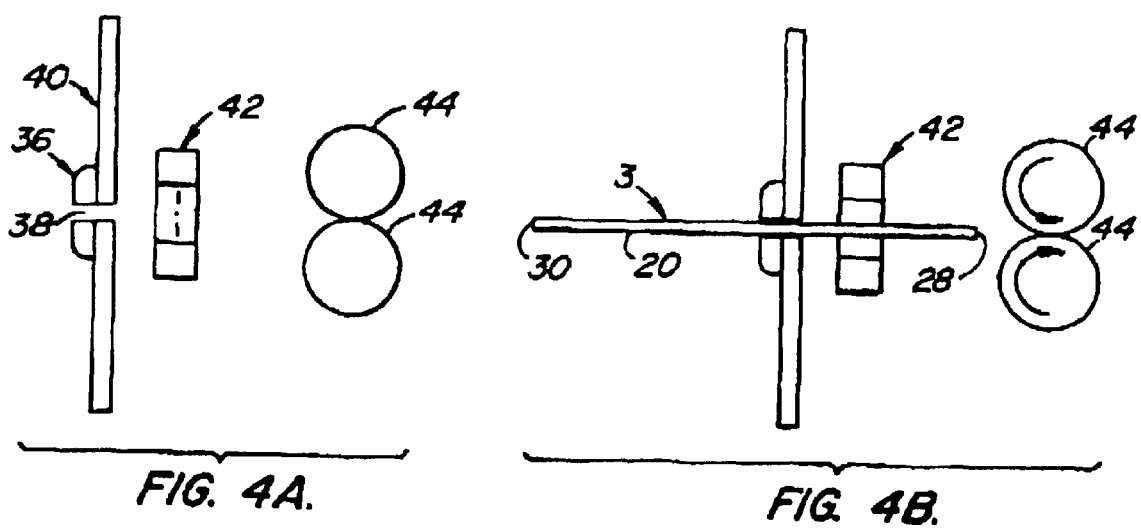

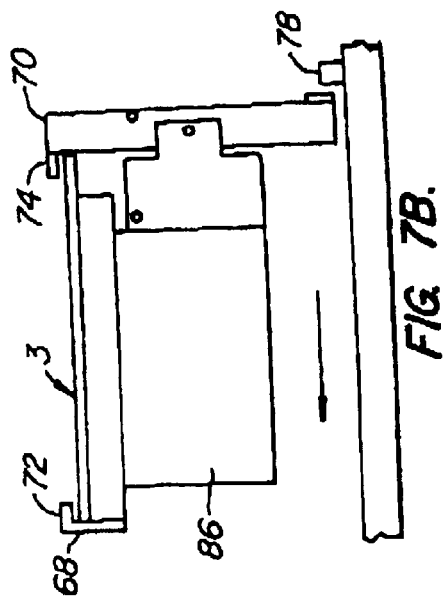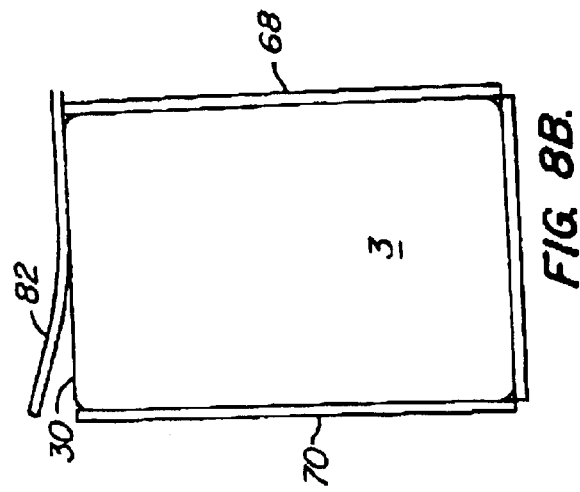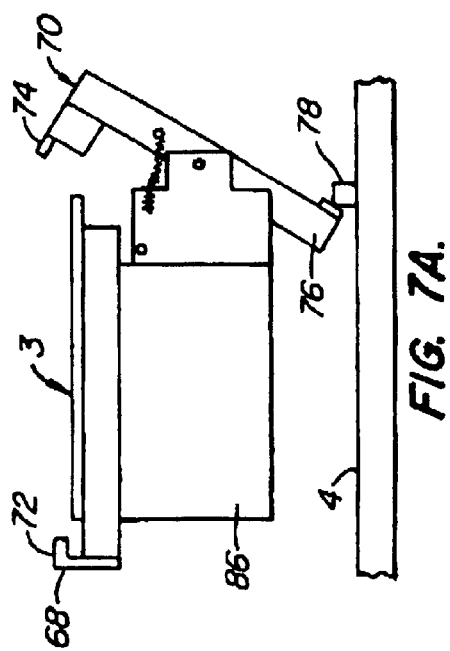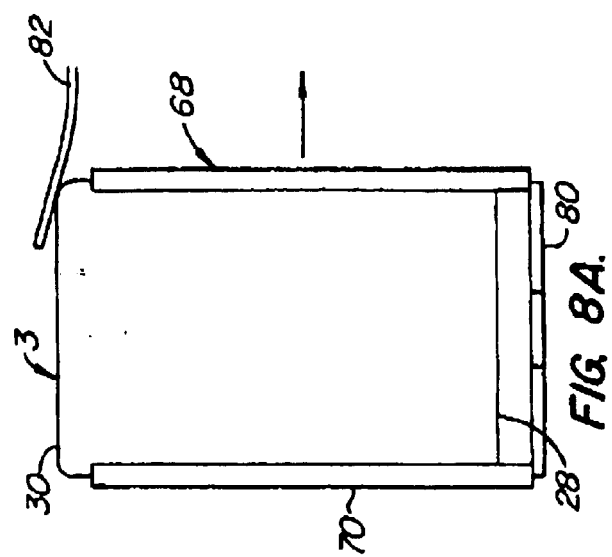

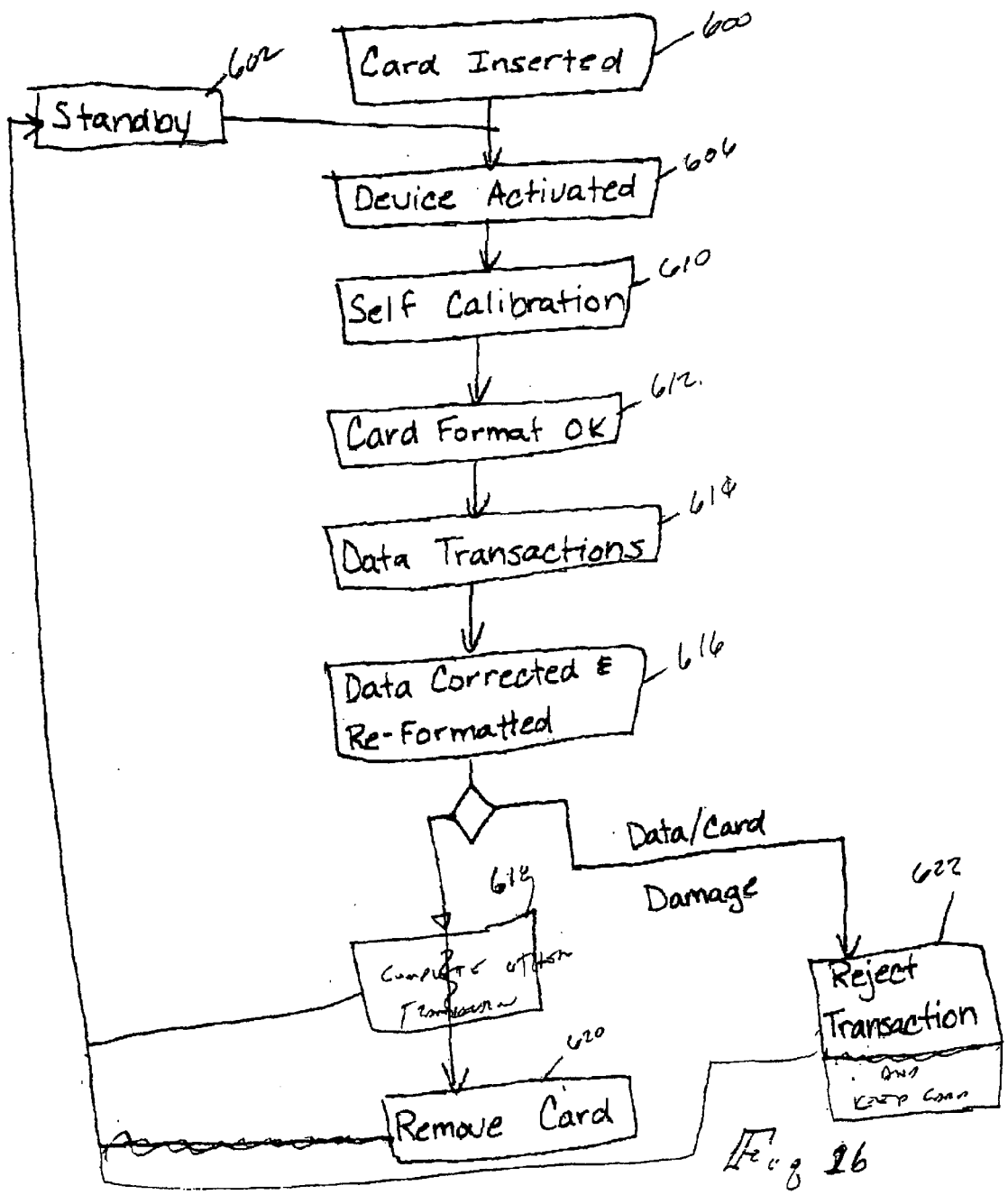

DATA STORAGE CARD HAVING A NON-MAGNETIC SUBSTRATE AND DATA SURFACE REGION AND METHOD FOR USING SAME

CROSS REFERENCE TO RELATED APPLICATIONS

This Application is a Continuation-in-Part of U.S. patent application Ser. No. 09/113,783 filed Jul. 10, 1998, now U.S. Pat. No. 6,131,816, issued on Oct. 17, 2000, which is a Continuation-in-Part of U.S. patent application Ser. No. 07/871,447, filed Apr. 21, 1992, now abandoned, which in turn, is a Continuation-in-Part of U.S. application Ser. No. 07/342,217 filed Apr. 24, 1989 which issued as U.S. Pat. No. 5,107,099 on Apr. 21, 1992.

BACKGROUND OF THE INVENTION

1. Field of the Invention

This invention relates to a data card having a substrate and a data surface region and more particularly related to a data card having or substrate and data surface region. In the preferred embodiment, the non-magnetic substrate is a glass-ceramic substrate and the data surface region comprises a magnetic storage medium having at least one layer of high density, high coercivity magnetic material for storing magnetic signals. In addition, the data storage card may further comprise a relatively hard, abradeable protective coating formed on the magnetic material layer and is selected to have a thickness between a maximum thickness which would materially attenuate magnetic signals passing between the magnetic material layer and a transducer and a minimum thickness enabling said protective coating to be abraded by usage in an ambient natural atmosphere operating environment for removing therefrom a known quantity of the protective coating.

The data card may be in the form of an encodeable card having a magnetic or optical data storage device adapted to be used as a credit card, medical identification card, identification card or the like.

The data storage device utilizes a recording medium or a data storage medium formed on a substrate capable of reliable data recording and reproduction in an ambient natural atmospheric operating environment. Traditional hard disks require a profoundly protected environment for reliable data recording and reproduction. In the preferred embodiment, the data storage device is in the form of a magnetically encodeable credit card having a data storage capability in the order of about 1 megabyte to about 500 megabytes or more.

2. Description of Prior Art

Digital data is stored in many forms. One data storage device uses spinning disks having a magnetic surface containing the digital data. The disks typically spin at a high rate of speed with the various tracks of data accessed by a radially movable data head.

Rotating a magnetic memory storage devices generally includes two elements namely, a rigid substance having a coating of magnetic media formed on at least one surface thereof. Aluminum alloys have been conventionally used as a substrate material for magnetic memo ry disks the present trend is towards smaller disk drives driven by drive motors having less torque as such, it has become necessary to develop thin light-weight rugged disks to replace the standard metal disks formed of an aluminum alloy having a cooling of magnetic media formed thereon.

Several alternatives are known in the art for replacing a standard aluminum alloy metal disk. These alternatives include glass substrates having specifically chemically tempered glass.

Also, glass-ceramic substrates have been developed. The glass-ceramic substrate composition in crystalline phase are controlled to develop specific characteristics of the glass-ceramic which enabling use of the glass-ceramic as a rigid substrate. Glass-ceramic substrate materials may have a polished surface to enhance the lubricity, optimized thermal expansion coefficients and be free of silica, such as quartz. The known glass-ceramic substrate materials are selected to have a bulk thermal expansion which is similar to that for known rigid metal substrates used for magnetic memory disks.

For example, U.S. Pat. No. 5,744,208 discloses a glass-ceramics containing lithium disilicate in tridymite. U.S. Pat. No. 5,789,056 discloses a thin film magnetic disk having a substrate made of glass or comparable rigid material.

Typical magnetic disks utilizing a glass substrate are disclosed in U.S. Pat. Nos. 6,048,466; 5,900,324; 5,824,427; 5,789,056; 5,766,727; 5,744,208; 5,569,518; 5,378,548; and 5,037,515.

It is also known in the art to provide texturing in a predetermined pattern on a substrate the adhesion of magnetic layers to the surface of a disk substrate. Typical texturing techniques and patterns are disclosed in U.S. Pat. Nos. 5,748,421; 5,725,625; 5,626,970; 5,496,606 and 4,996,622.

It is also known in the art to utilize materials other than aluminum alloy or glass for disk substrates. U.S. Pat. No. 5,492,745 discloses disks wherein a non-magnetic substrate can be formed of a metal substrate, glass substrate, ceramic substrate or a resin substrate.

U.S. Pat. Nos. 5,736,262 and 5,352,501 also disclose use of non-magnetic substrates which are textured and/or processed to enhance performance of magnetic recording mediums formed thereon.

Another type of data storage device is the credit card having a magnet stripe along one surface. However, such cards have limited storage capacity because of the nature of the magnetic stripe and the method of recording data onto the magnetic stripe.

U.S. Pat. Nos. 5,396,545 and 4,791,283 disclose typical state-of-the-art financial cards or transaction cards having a single magnetic stripe. The storage densities of single stripe magnetic cards are defined by the ANSI Standard Specifications. Prior art magnetically encoded cards may have up to three (3) data tracks as described in Table 1 below:

TABLE 1

| Track | Density | Targeted Application |
|---|---|---|
| 1 | 553 bytes | Designed for Airline Use |
| 2 | 200 bytes | Designed for Credit Card Use |
| 3 | 535 bytes | Not for General use reserved for Special Applications, Has Read/Write capability |
| Total Storage | 1,288 bytes | |

A general trend presently exists to develop special purpose data cards for non-financial data applications such as for driver's licenses, building security, insurance identification, medical insurance identification, personal identification, inventory identification, baggage tags and the like.

United States Patents disclosing cards having one or more magnetic strips and/or semiconductor memory include U.S. Pat. Nos. 5,883,377; 5,844,230; 5,59,885 and 5,714,747. Certain of these cards using a semi-conductor memory have storage densities as high as 8 kilobytes.

Other known storage devices used in non-card applications, such as for example, data storage mediums in hard disk, have storage densities greater than the storage densities of the known credit cards having one or more magnetic stripes including three (3) data tracks. A data storage medium in a hard disc drive typically, has an 130 mm, 95 mm, 65 mm or 25 mm outer diameter with a hole in the middle for mounting the medium on a spindle motor. Hard disk drive medium is designed and manufactured for use as a rotating memory device with circumferential discrete data tracks. The medium, or disks, typically spin at a high rate of speed with the data tracks accessed by one or more a radially movable read/write heads.

Through a plating and/or a sputter process, various types and layers of magnetic or non-magnetic materials are deposited on a round substrate which, when used in conjunction with a data recording head, can read and write data to the disk. The layer which provides the data memory is formed of a high coercive force magnetic material. This high coercive force magnetic layer is designed for maximum signal-to-noise ratio. This is attained by circumferential texturing, which is a mechanical process of scratching or buffering the disk substrate surface to provide circumferential anisotropy of the magnetic domains. Thereafter, the magnetic material is deposited on the circumferentially treated surface using known plating and/or sputtering technology.

The disk drive manufacturer must exercise similar clean room conditions in order to avoid damaging or contaminating the medium. Contamination or damage to the medium will cause an unacceptable error rate for the disk drive. To further insure data integrity, the drive manufacturer mounts the heads and medium, commonly called a head/disk assembly, inside a sealed disk drive cavity. As the medium rotates, it generates airflow over the head/disk assembly. Particles or contamination inside the drive are captured by filters located within the air flow. Capillary tubes and/or breather filters located in the lid of disk drive are used to equalize pressure and prevent moisture from entering the head/disk assembly.

The magnetic head(s) that perform the read/write operations can indent, mark or damage the medium through shock, vibration or improper head/medium design. The medium layers are very thin and fragile, on the order of a few microinches thick, and can be easily destroyed by mechanical damage imposed by the head. Non-operating environmental conditions, such as those normally found outside a clean room or outside a disk drive, can also easily render the medium unusable. Some of these major concerns which adversely affect medium quality and usability are:

(a) Moisture, which can cause the Cobalt in the high coercive force magnetic layer to corrode which causes the medium surface to flake off or pit and compromise medium performance;

(b) Chemical contamination from out gassing of internal head/disk assembly components such as uncured epoxy and plasticizers from gaskets, and such chemical contamination can cause the head to stick to the media surface resulting in stopping the drive from spinning or causing a head/disk crash resulting in substantial loss of data;

(c) Particles inside the drive which can cause a head crash that can damage the medium beyond use;

(d) Handling damage by the disk or drive manufacturer including finger prints, scratches, and indentations which can cause nonreversible loss of data;

(e) Shock and vibration from improper drive design or use can cause a head crash that damages the medium beyond use; and (f) Poorly designed drives can fail during drive power up cycles due to high stiction, friction, temperature/humidity conditions or improper lubricant conditions.

A hard disk drive medium has no direct means to prevent demagnetization by stray magnetic fields should the drive medium be exposed to a stray field having sufficient magnetic field strength to erase the recorded data. Further, no surface of hard disk drive medium readily permits cleaning, and there are no known commercial hard disk drives that provide a means to clean the medium. For example, fingerprints cannot easily be removed from the surface of a hard disk drive medium.

Further, any attempts to use a hard disk drive magnetic medium outside of its intended clean and protected environment has been unsuccessful for a number of reasons, such as those discussed above.

As the demand for improved portable cards having increased memory storage capacity, such as credit cards, non-financial cards, transaction cards and the like increases, the driving factor as to the likely success or failure of an improved card is directly related to: (a) the storage densities available in such a card for storing and retrieving data; (b) the integrity of the magnetically encoded data in such a card; and (c) its ability to resist mechanical, chemical and magnetic degradation in an unprotected environment; such as in an ambient natural atmosphere operating environment in which financial and non-financial cards are used.

The magnetic disk media in known rigid disk drives are not designed to withstand even the most minor surface damage or degradation. The magnetic disk media for use inside the profoundly clean disk drive has a very hard but thin overcoat or protective layer. That overcoat or protective layer is typically diamond-like carbon on the order of 50 Angstroms to 300 Angstroms thick and is primarily used to control corrosion of the underlying cobalt based high coercivity layer. The underlying magnetic high coercivity film is also very thin, in the order of 150 to 500 Angstroms.

Since the protective layer includes at least one layer of a highly magnetic permeable material, the added thickness of this highly magnetic permeable material does not appear to increase the magnetic separation loss during read back as reported in U.S. Pat. No. 5,041,922.

The most prevalent type of media construction for use in hard disk drives is an aluminum substrate with a thick layer of Nickel Phosphor plated on the surface for polishing. This is an underlayer to the high coercivity magnetics. The Nickel Phosphor layer is typically 10 to 12 microns thick and is used to provide a material that can be subsequently polished to a smoother finish than the aluminum surface.

Hard disk drive media substrate range in thickness from 0.020 inches to 0.050 inches. Thinner substrates are desirable in order to be able to package more disks in the disk drive but have the problem of mechanical flutter, especially at high RPM. None of these substrates are bendable. A large bend radius of 20 inches will result in permanent deformation of the disk. A bend radius of less than 20 inches will result in permanent deformation as well as fracturing of the thick Nickel Phosphor layer. This fracturing of the Nickel Phosphor will propagate through the high coercivity magnetic layer rendering the media useless as a storage device.

No thick Nickel Phosphor underlayer is used on the portable card of the present invention. Therefore, fracturing problems associated with a thick Nickel Phosphor are avoided.

The portable card structure allows a card to be bendable to a degree depending upon the thickness and material of the substrate. For example, on one extreme are thick cards having a substrate formed of Zirconium. Such cards are 0.020 inches thick and can be bendable to a radius of approximately 10 inches. Another type of card uses a plastic substrate. Such cards are 0.030 inches thick and are bendable to a radius of approximately 4 inches. A thin card, such as a card having a substrate, formed of stainless steel, which is in the order of 0.005 inches thick and are bendable to a radius in excess of 4 inches without fracturing or becoming permanently deformed.

The protective coating of the present invention can be used with such cards in all forms of data storage devices, data storage sections, data storage medium a nd recording mediums. The known prior art media used for disk drive including the unabradable, thin protective coatings are not capable of being used in such portable cards.

SUMMARY OF THE INVENTION

The present invention is directed to a data system especially suited for use with credit card-type substrates which permits much more data to be written onto and read from the substrate than available with credit cards with conventional magnetic stripes.

The protective coating is formed of a material which resists at least one of chemical, magnetic and controlled mechanical degradation of the data storage device. The protective coating may be formed of at least one layer, wherein the least one layer includes the magnetically permeable, magnetically saturable storage material.

In the alternative, the protective coating may have at least two layers wherein one of the at least two layers includes or comprises a magnetically permeable, magnetically saturable storage material and the other of the at least two layers includes a non-magnetic abrasion resisting layer formed on the one of the two layers.

In its broadest aspect, the invention resides in a data storage device comprising a substrate having at least one surface with at least one high density magnetically coercive material disposed on the substrate for storing magnetic signals. The magnetic material may be isotropic or anisotropic. Such materials are well known in the art. At least one layer formed of non-magnetic material, which functions as a decoupler or quantum effect insulator, may be disposed on the substrate for defining an exchange break layer. A protective coating is formed on the substrate and is selected to have a depth in a direction substantially normal to the exchange break layer to facilitate passage of magnetic signals, in an ambient natural atmospheric operating environment, through the protective layer to the coercive material having the axis of magnetization in the predetermined direction.

The data system includes broadly a substrate, such as a credit card type substrate, forming a data card and a data unit. The substrate had first and second edges and a data surface region between the edges. The data surface region is preferably plated or sputtered with nickel-cobalt as opposed to conventional credit cards which use ferrous oxide. The data unit include a base supporting several components. A substrate supports, which supports the substrate, is mounted to the base for controlled movement along a first path. The first path can be straight or curved. A data head drive is mounted to he base and includes a data head reciprocally movable along a second path. The first and second paths are generally transverse, typically perpendicular, to one another. The data head includes a data head surface which contacts the data surface region on the substrate. The data unit also includes first and second data head support surfaces positioned along the second path adjacent to the first and second edges of the substrate. The data head surface also contacts the first and second data head support surfaces as the data head moves along the second path.

The data head supports surfaces are preferably coplanar with the data surface region of the substrate. This provides a smooth transition for the data head between the data surface region and the data head support surfaces. The use of the data head support surfaces provides a region for the data head to accelerate and decelerate at each end of a pass over the data surface region so the data head can move over the data surface region at the constant surface speed.

The invention may also include a substrate handler including a substrate feeder, which delivers a substrate to and removes the substrate from the substrate support, and a substrate postioner, which automatically positions the substrate on, and secures the substrate to, the substrate support. The substrate postioner typically includes feed rollers and may also include a cleaner roller to clean the data surface region as the substrate passes through the substrate feeder.

None of the known prior art anticipates, discloses, teaches or suggests portable cards including portable data storage cards using a recording medium based standard hard disk drive medium technology with a high coercive force layer using a novel protective layer having a selected thickness and wherein such use occurs outside the disk drive protective enclosure and in natural atmosphere and environment. This invention is clearly new, novel and unobvious to persons skilled-in-the-art for all of the reasons set forth herein.

Therefore, one advantage of the data storage device or data card is that the same is capable of reliable read and write operations after handling in a non-clean, normal environment.

Another advantage of the present invention is that several media form factors can be provided for use in such a portable card or data card including a magnetically encodeable card of a standard credit card size which is capable of multiple read and write operations.

Another advantage of the present invention is that other portable card or data card sizes and configurations, such as rectangular, square or circular shaped, may utilize the teachings of the present invention.

Another advantage of the present invention is that a portable card or data card using such a data storage device can be provided with a memory capacity substantially greater than that of the conventional financial cards using a magnetic stripe.

Another advantage of the present invention is that a data storage device or data card can be provided which can be processed in a manner similar to a standard financial credit card.

Another advantage of the present invention is that a data storage device or data card can be provided which can be exposed to rough handling in a manner similar to a credit card.

Another advantage of the present invention is that a portable card utilizing the teachings of the present invention can be stored in a wallet and can be freely handled without concerns for contamination and without regard to whether or not the card is impervious to scratches stray magnetic fields, fingerprints and other types of damage which would cause a prior art hard disk medium to fail.

Another advantage of the present invention is that the data storage device including its use as a portable card, data card or magnetically encodeable card may include a high permeability protection coating in combination with a protective coating to prevent stray weak to medium strength (e.g. all but the strongest) magnetic fields from demagnetizing and/or erasing the recorded data.

Another advantage of the present invention is that the data storage device or data card utilizes a recording medium having a protective coating formed on the uppermost surface thereby permitting cleaning of a magnetically encodeable credit card by pressure pads, abrasive materials and chemicals without damage to the recording medium including the magnetic signals stored therein.

Another advantage of the present invention is that the data storage device or data card may be used in a method of processing magnetic signals using a magnetic recording medium having a high density magnetically coercive material for storing magnetic signals with the coercive material axes of magnetization oriented in a predetermined direction and a protective coating as described herein.

BRIEF DESCRIPTION OF THE DRAWINGS

The foregoing and other advantages of this invention will be apparent from the following description of the preferred embodiment of the invention when considered with the illustrations and accompanying drawings, which include the following Figures:

FIGS. 2A, 2B and 2C are front, side and rear elevational views of the substrate of FIG. 1;

FIG. 3 is a side view illustrating the shape of the opening in the card entry of FIG. 1;

FIG. 4A is a simplified schematic view illustrating the card entry, card sensor and first feed rollers of the substrate feeder of FIG. 1;

FIG. 4B illustrates the components of FIG. 4A with a card being inserted through the card entry and through the card sensor, which activates the first feed rollers which will then grip the card as the user continues to insert the card through the card entry;

FIG. 7A is a simplified view illustrating the engagement of the bottom of a movable side registration member with a stud extending from the base when a card carriage, on which the card support is mounted, is at the load/unload position, the load/unload position being indicated by the card in dashed lines in FIG. 1;

FIG. 7B illustrates the release of the movable side registration member as the carriage begins to move away from the load/unload position towards the solid line position of FIG. 1, thus capturing the third and fourth edges of the card between the movable and stationary side registration members;

FIGS. 8A and 8B are plan views of the card support and card showing how the card guide of FIGS. 1 and 6A deflects the card into its fully loaded position as the carriage moves towards the solid line position of FIG. 1;

FIG. 16 is a simplified schematic diagram of a card reader for reading and reproducing information a portable card utilizing the teachings of the present invention.

DESCRIPTION OF THE PREFERRED EMBODIMENTS

In the data card of the present invention, it is envisioned that an appropriate non-magnetic substrate may be used for practicing this invention. Typical of such non-magnetic substrates include, but is not limited to, glass substrates, crystallized glass substrates, aluminum substrates, ceramic substrates, carbon substrates, silicon substrates and the like.

In addition, it is further envisioned that substrates formed of ceramic material or glass-ceramic material may be used in practicing this invention.

A ceramic is typically a product made by the baking or firing of a non-metallic mineral, such as tile, cement, plaster refractories and brick. Ceramic coatings comprise a non-metallic, inorganic coating made of sprayed aluminum oxide or of zirconium oxide are a cemented coating of an intermetallic compound such as aluminum disilicide, of essentially crystalline nature, applied as a protective film on metal.

It is known in the art that glass comp rises a hard, amorphous, inorganic, usually transparent, brittle substance made by fusing silicates, sometimes borates and phosphates, with certain basic oxides and then rapidly cooling to prevent crystallization. A glass-ceramic material is a non-magnetic material which is formed of a pre-determined composition of glass and ceramic.

It is also known in the art that a substrate for a magnetic disk can be formed of a resin material as disclosed in U.S. Pat. No. 5,492,745.

It is also known in the art that a non-magnetic substrate may be treated, textured or coated with a non-magnetic primer layer enhancing adhesion of the magnetic medium formed thereon.

All the above substrates are well known in the art and have been used in fabrication of magnetic disks used in disk drives.

The discussion set forth below is directed to several embodiments of the invention, the preferred embodiments which utilizes a magnetic storage medium having at least one layer of high density, high coercivity magnetic material for storing magnetic signals. In addition, the data storage card or data card may further comprise a relatively hard, abradeable protective coating formed on the magnetic material layer.

Figure 1:
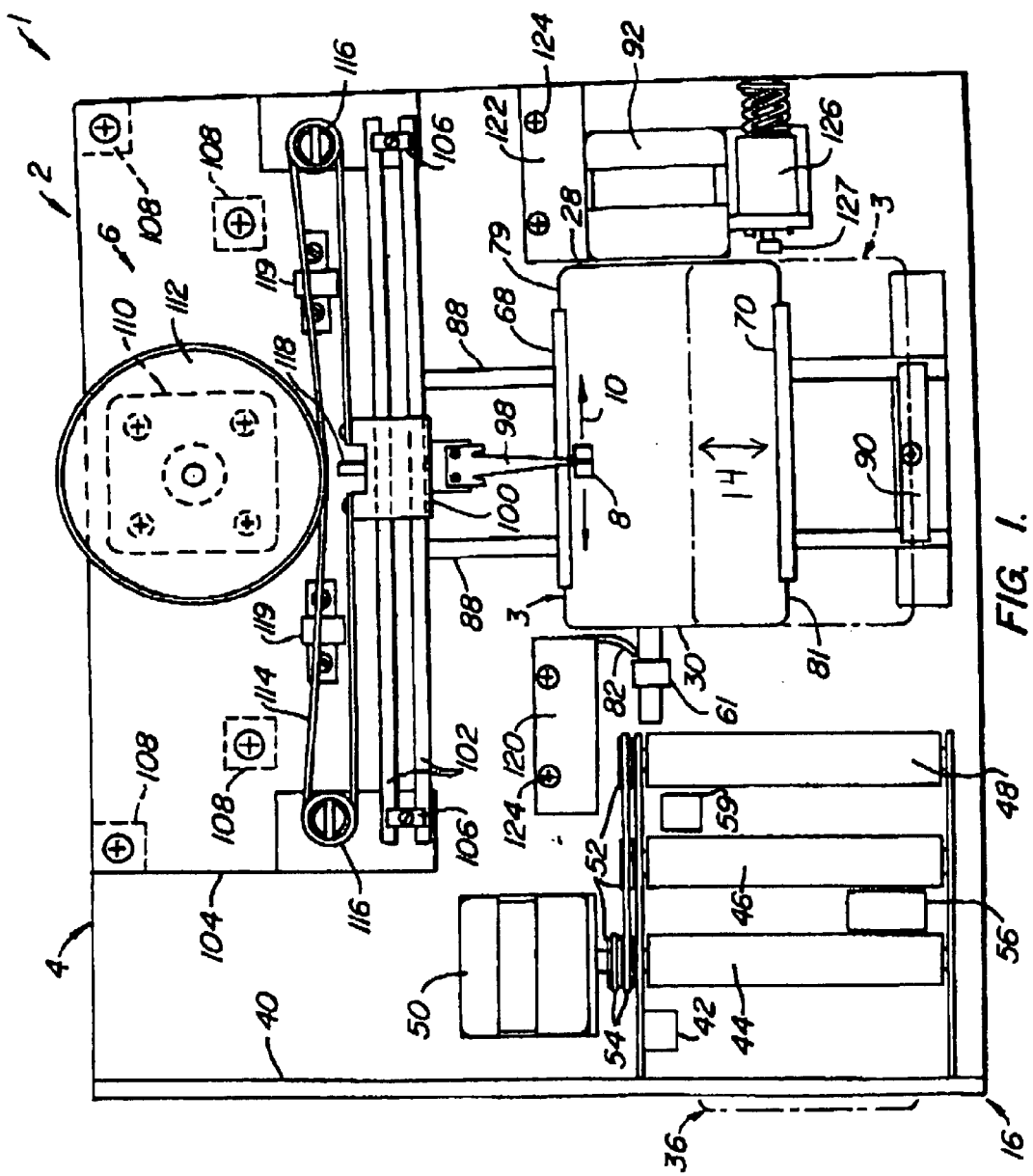
FIG. 1 is a simplified plan view of a data unit made according to the invention.

FIG. 1 illustrates, in a relatively simple schematic form, a data system 1 mad according to the invention. Data system 1 comprises a data unit 2 and a substrate 3; substrate 3 is preferably in the form of a data card or credit card-size card 3. Data unit 2 includes a base, which supports the various other components, a data head driver 6, which drives a data head 8 along a second path 10, a substrate or card support assembly 12, which moves card 3 or another substrate along a first path 14, and a substrate feeder 16, which drives card 3 to and form the substrate support assembly.

Card 3 is preferably a sandwich construction 0.51 mm (0.020 inch) thick ceramic core and upper and lower surfaces made of a suitable plastic material about 0.13 mm (0.005 inch) thick. FIG. 2A illustrates the front or bottom side 20 (relative to the figures) of card 3 having an embossed letter area 22 and a back, data or top side 24 having a data surface region 26 extending between first and second edges 28, 30 of the card.

Side 24 is also preferable includes a magnetic typically ferrous oxide, stripe 32 similar to that used with conventional credit cards. Data surface region 26 is preferably a magnetic region, and may also include ferrous oxide as a magnetic material. However, because of the use environment, to be discussed below, it is desired that region 26 be smooth and resistant to abrasion. This can be achieved in various conventional ways, such as by sputtering with carbon.

In the preferred embodiment of FIGS. 2A–2C, only a portion of side 24 is covered by data surface region 26. In some embodiment it may be desired to cover most or all of the surface 24 with data surface region 26. A directional arrow 34 may also be included to aid the user in proper insertion of card 3 into card entry 36 shown in FIGS. 1, 3, 4A and 4B. As illustrated in FIG. 3, the opening 38 in card entry 36 had an enlarged portion to accommodate embossed letter area 22 shown in FIGS. 2A and 2B.

FIGS. 4A and 4B illustrate a portion of substrate feeder 16, including card entry 36 mounted to the front panel 40 of data unit 2. The user begins the read/write process by inserting a card 3 into opening 38 of card entry 36 sufficiently far to trip a light beam in a card sensor 42 which causes three sets of feed rollers 44, 46, and 48 to begin rotating as indicated by the arrows in FIGS. 4B and 5D. Feed rollers 44, 46, and 48 are driven by a feed system motor 50 through various pulleys 52 and belts 54. Once the user pushes card 3 far enough into unit 2 so that the first edge 28 of card 3 is captured that the nip of rollers 44, the feed rollers automatically move card 3 thorough substrate feeder 16 as suggested by FIGS. 5A–7A.

Figure 5A:
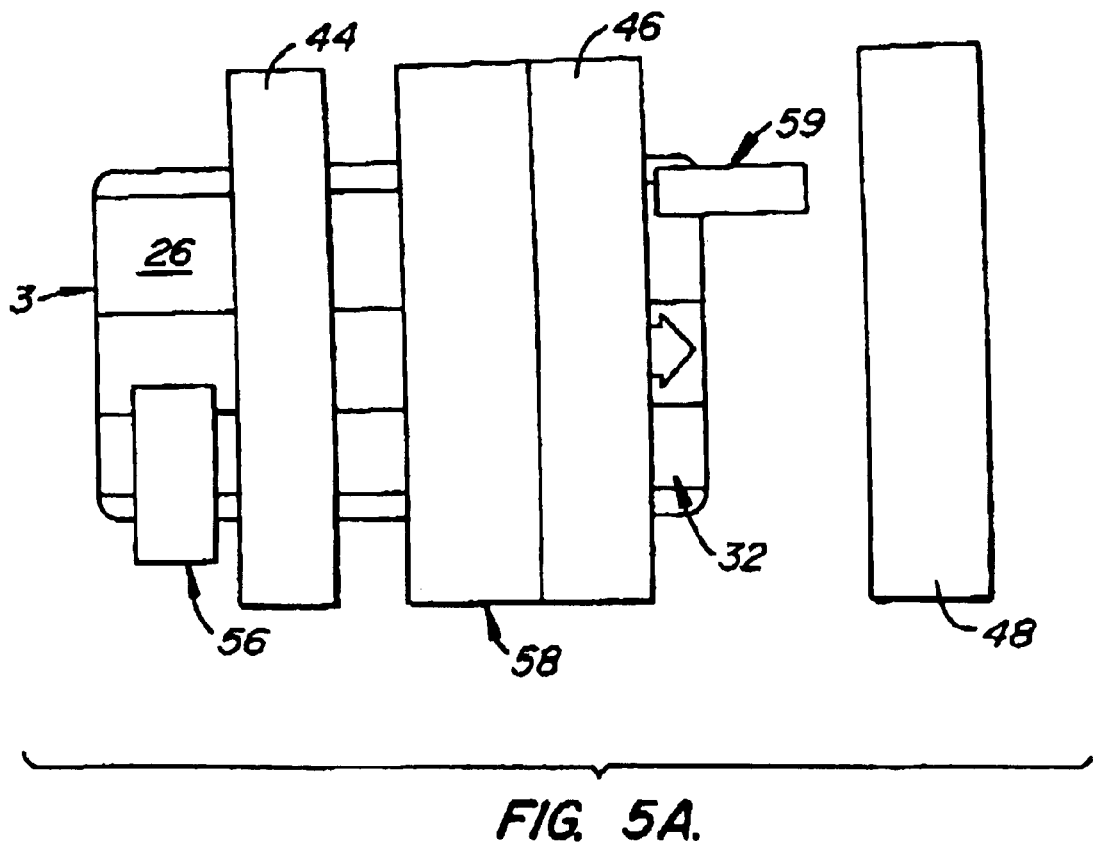
FIGS. 5A and 5B are top plan and side elevational views of a portion of the substrate feeder of FIG. 1, but also illustrating a counter-rotating cleaning roller, not showing in FIG. 1 for clarity, with the card engaged by the first and second sets of feed rollers and the upper surface of the card being cleaned by the counter-rotating cleaning roller.
Figure 5B:
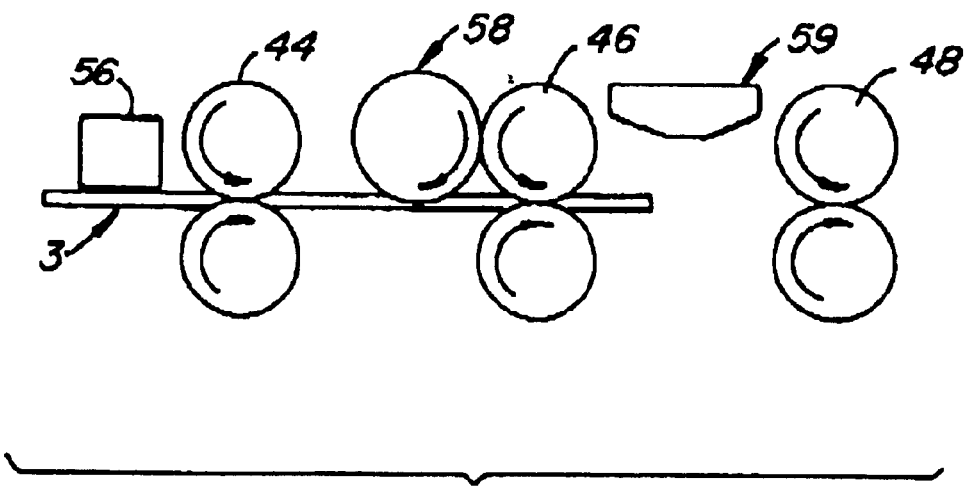

FIGS. 1, 5A and 5B illustrate the use of a magnetic stripe reader 56 which reads, in a conventional fashion, any information on magnetic stripe 32 as appropriate. Substrate feeder 16 also includes a counter-rotating cleaning roller 58. Cleaning roller 58 is not shown in FIG. 1 for clarity. Cleaning roller 58 is used to ensure that data surface region 26 is clean of particles and debris prior to being accessed by data head 8. Substrate feeder 16 also includes a reflective sensor 54 which senses the presence of data surface region 26. If card 3 has no data surface region 26, then feed rollers 44, 46 reverse the direction of card 3 and return it to the user with only magnetic stripe 32 having been read by magnetic stripe reader 56. Assuming card 3 includes a data surface region 26, feed rollers 44, 46, 48 continue the movement of card 3 past optical sensor 61 and towards card support 60 of card support assembly 12.

Figure 9A:
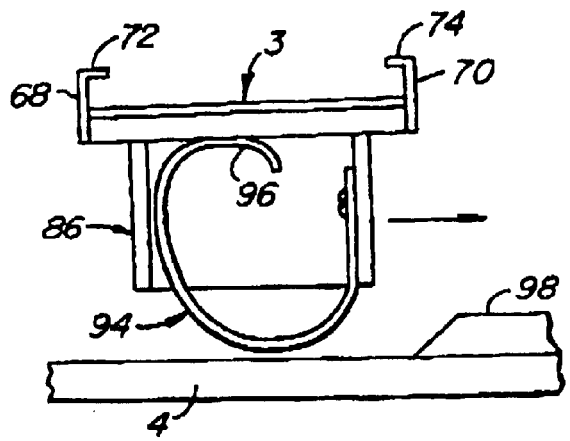
FIGS. 9A and 9B illustrate the movement of a vertically deflection spring which engages the bottom of the card as the carriage moves towards the solid line position of FIG. 1, thus securing the card against the inwardly extending lips of the stationary and movable side registration members.
Figure 9B:
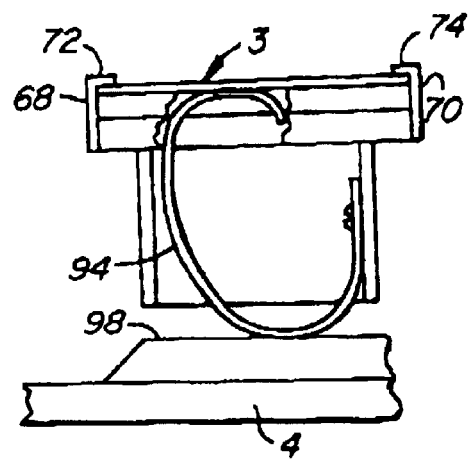

One end 62 of card support 60 is open to permit the free entry of card 3 onto the card support surface 64 of the card support. Card support surface 64 has an opening 66 formed through the middle of the surface as will be described below with reference to FIGS. 9A and 9B. Referring now also to FIGS. 7A and 7B, card support 60 is seen to include a stationary side registration member 68 and a movable side registration member 70. Members 68 and 70 have overhanging lips 72, 74. When card support 60 is in the load/unload position of FIGS. 6A, 6B and 7A, which corresponds to the dashed-line positions of card 3 in FIG. 1, movable side registration member 70 is pivoted to its position of FIG. 7A by the engagement of the lower end 76 of member 70 with a stationary stud 78 extending upwardly form base 4. This permits card 3 to be freely driven onto surface 64 of card support 60 between registration members 68, 70. The initial movement of assembly 12 along path 14 towards data head driver 6 causes registration member 70 to engage a fourth edge 81 of card 3 and drive the third edge 79 o the card against registration member 68.

Figure 6A:
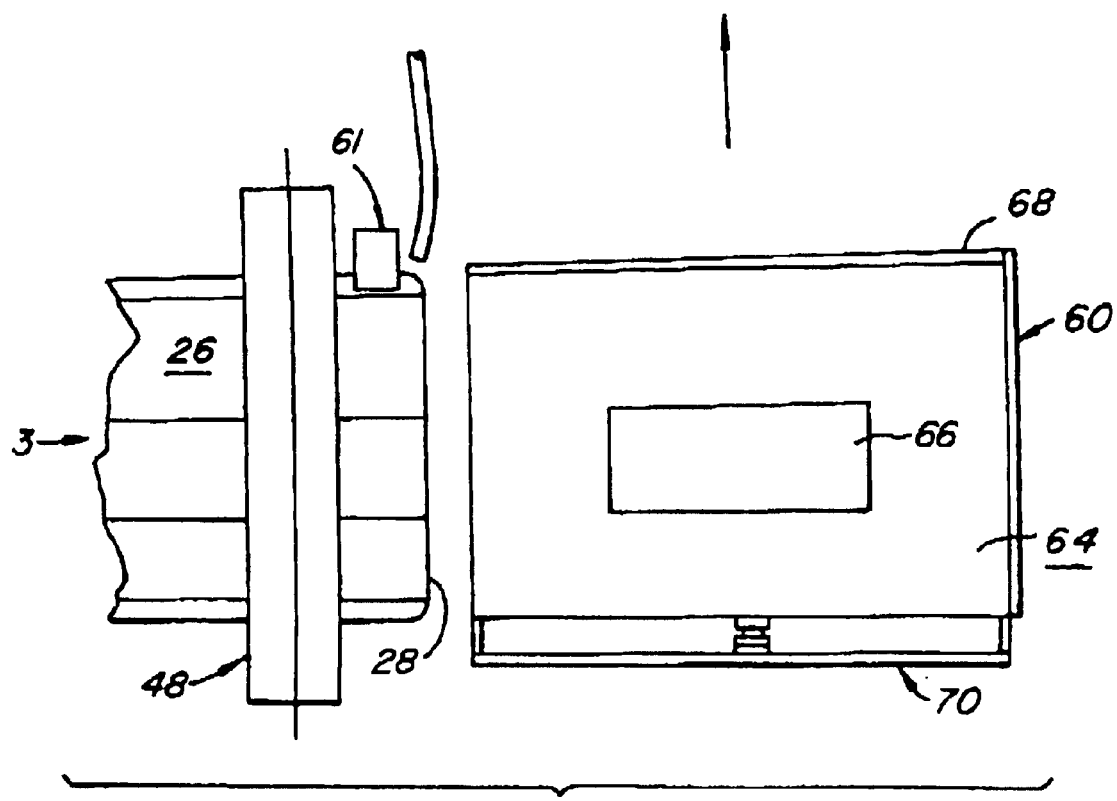
FIGS. 6A and 6B illustrate movement of the card between the third feed rollers, past a sensor and towards the card support of the card support assembly of FIG. 1.
Figure 6B:
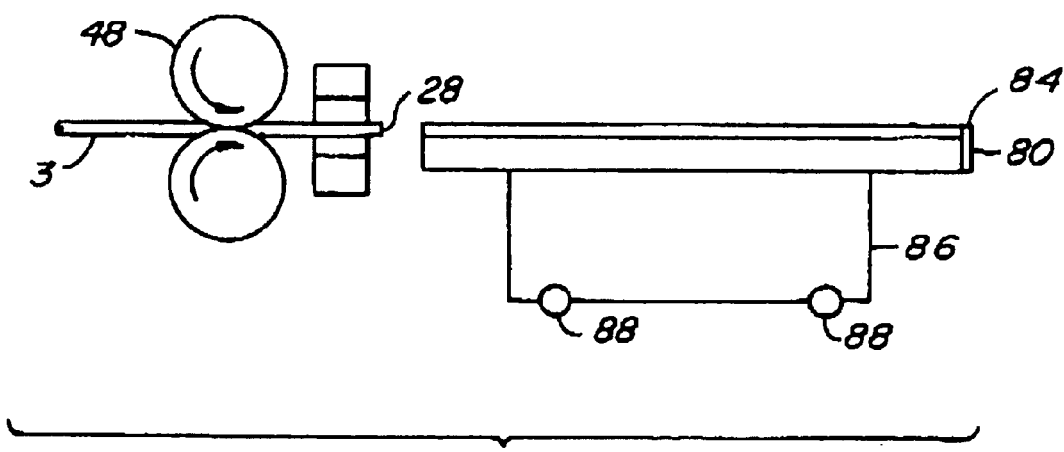

First edge 29 of card 3 is driven against abutment edge 80 of card support 60 by the movement of card support 60 along the first path 14 towards data head driver 6, that is from the dashed-line position to the solid-line position of FIG. 1. Such movement along first path 14 causes second edge 30 of card 3 to engage an angled card guide 82 which drives card 3 fully onto card support 60 as shown in FIGS. 8A and 8B. Abutment edge 80 is sized so that its upper edge 84, see FIG. 6B, is slightly below, such as 0.38 mm (0.015 inch) below the top surface 24 of card 3 when the card is pressed upwardly to engage lips 72, 74 of members 68, 70 in the manner discussed below.

Card support 60 is mount ed to and is carried by the carriage 86, the carriage being slidable along a pair of guide shafts 88, the guide shafts being supported on base 4 by shaft clamps 80, only one of which is shown in FIG. 1. Carriage 86, and thus card support 60 with card 3 thereon, is driven along first path 14 by a carriage motor 92.

The vertical movement or indexing of card 3 is achieved by the use of a C-shaped spring 94 mounted to the interior of carriage 86. An upper end 96 of spring 94 is aligned with and passes through opening 66 formed in card support surface 64 and illustrated in FIG. 6A As carriage 86 moves along first path 14 from the load/unload position corresponding to he dashed-line position of FIG. 1, towards data head driver 6, spring 94 rides up onto a cam 98 extending upwardly from base 4. This causes card 3 to be biased upwardly against lips 72, 74 and held in place against inadvertent movement during read/write operations.

Returning again to FIG. 1, card 3 is shown with data head 9 at track "000"position. Data head 9 is preferably of the magnetic head contact-type which contacts data surface region as data head 8 is move along second path 10. Data head 8 is mounted to the distal end of an arm 98 which is mounted to a head carriage 100. Head carriage 100 is slidably mounted to a pair of guide shafts 102, the guide shafts mounted to a motor mount plate 104 by a pair of shaft clamps 106. Motor mount plate 104 is adjustably mounted to base 4 by four spacer mounts 108. Data head driver 6 also includes a read/write head motor 110 which drives a pulley 112 in alternating clockwise and counter-clockwise directions. Pulley 112 is coupled to carriage 100 by a drive band 114 which passes around a pair of roller bearings 116 as well as pulley 112.

The position of data head 8 relative to data surface region 18 is provided by the rotary position of pulley 112 and by a sensor interrupter 118 being sensed by a pair of sensors 119. Sensors 119 are generally aligned with edges 28, 30 of card 3 when the card is in the read/write position of FIG. 1.

Second path 10 extends beyond first and second edges 2, 30 onto data head support surfaces 120, 122. Data head support surfaces 120, 122 are generally coplanar with data surface region 18 so that data head 8 moves smoothly form region 1 onto support surfaces 120, 122 are generally coplanar with data surface region 18 so that data head 8 moves smoothly from region 18 onto support surface 120, 122. The use of support surfaces 120, 122 permits data head 8 to move across data surface region 18 onto support surfaces 120, 122. The use of support surfaces 120, 122 permits data head 8 to move across data surface region 18 at full speed. Preferably, data head 8 slows down, stops, reverses direction, and then speeds up for each subsequent pass while on one of data surfaces 120, 122. During this deceleration, stopping, reversal of direction, and acceleration, carriage motor 92 has a chance to index card 3 one track width along first path 14. Therefore, by the time data head 8 is ready to reengage data surface region 18, the next track, which may or may not be the adjacent track, is aligned with second path 10 and thus can be read by or written to by data head 8. Data head support surface 120, 122 are preferably low friction, low abrasion surfaces suitable for the sliding movement of data head 8 thereover. To ensure proper alignment, each data surface 120 is preferably provided with appropriate height adjusters 124 is preferably provided with appropriate height adjusters 124. The gap between surfaces 120, 122 and card 3 is preferably small enough so that data head 8 traverses the gap smoothly. If necessary support at the gap can be provided by, for example, a small jet of air.

Figure 10:
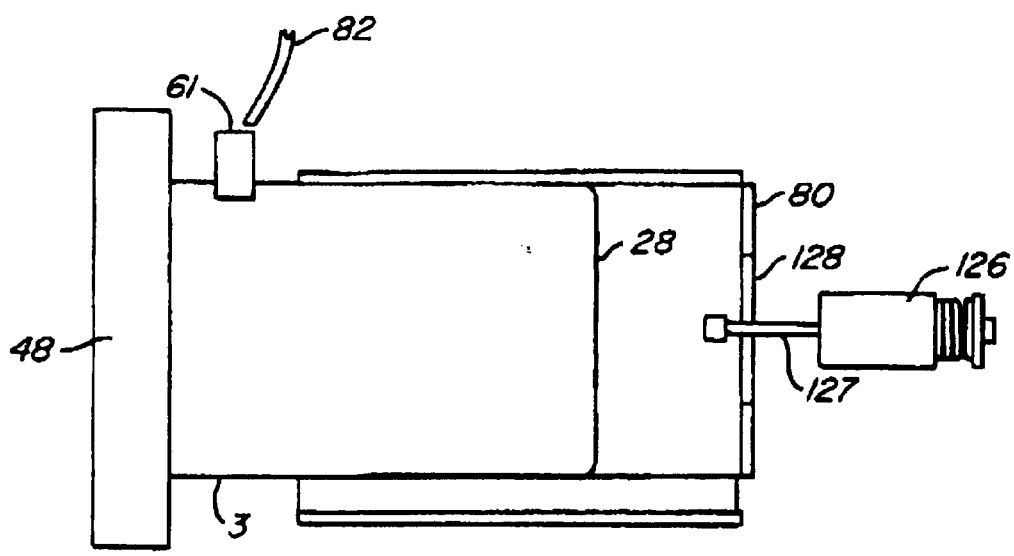
FIG. 10 illustrates the extension of the plush solenoid of FIG. 1 used to cause the card to reengage with the third feed rollers once the card is returned to the load/unload of FIG. 7A position after a read/write procedure has been conducted.

Data head 8 is preferably at the rest position on data head support surface 120 or data head support surface 122 when card 3 is moved form a dashed-line to the solid-line positions of FIG. 1. This keeps data head 8 from contacting side registration member 68 during such movement. At the completion of read/write operations, carriage 86 moves tot he load/unload position of FIGS. 7A and 10 whereupon a push solenoid 126 is actuated, see FIG. 10, to push card 3 until the card is captured between third feed rollers 48. Push solenoid 126 has a plunger 127 which passes through a gap 128 in abutment edge 80 to engage first edge 28 of card 3. Feed rollers 44, 46 and 48, all rotating in the opposite direction indicated in FIG. 5B, drive card 3 back through opening 38 in card entry 36 to about he position of FIG. 4B.

In use, a user inserts a card 3 through opening 38 in card entry 36 whereupon substrate reader 16 drives it past magnetic stripe reader 56 and to reflective sensor 59. Assuming reflective sensor 59 senses the presence of data surface region 26, rollers 46, 48 continue driving card 3 towards substrate support assembly 12. After card 3 has passed third feed rollers 48, the inertia of the card causes the card to continue moving onto support surface 64 of card support 60. To ensure first edge 28 of card 3 abuts abutment edge 80 of card support 60, a card guide 82 is used to engage second edge 30 as card 3 moves from the load/unload position of FIG. 7A, that is the dash line position of FIG. 1, to the read/write position, that is the solid line position of FIG. 7A, that is the dash line position of FIG. 1, to the read/write position, that is the solid line position of FIG. 1. Third edge 79 of card 3 is driven against stationary side registration member 68 by the pivotal movement of spring biased side registration member 70 during the initial movement of the card from the dashed position toward the solid-line position of FIG. 1. Continued movement of card 3 toward the solid-lien position of FIG. 1 causes spring 94 to be biased upwardly to drive card 3 upwardly until the lateral edges 79, 81 of the card engage lips 72, 74 of registration members 68, 70.

Once in the initial read/write position of FIG. 1, motor 110 drives data head 9 from one of data head support surfaces 120, 122 and data surface region 26 of card 3. In the pre erred embodiment, motor 110 is designed to cause data head 8 to reach its desired speed of, for example, 318 cm per second 125 inches per second) by the time data head 9 reaches card 3. It is desired that information on data surface region 26 be written at the rate of 36,000 bits per inch or greater. The density of the recording is determined by several factors, including the uniformity in movement at which data head 8 passes over region 26, the construction of head 8, the construction of data surface region 6, the frequency of the read/write clock, and other conventional factors.

At the end of each pass, while data head 8 is moving over data head support surface 24 during its deceleration, stopping, reversal of direction, and acceleration, card 3 is indexed to the next track position to be accessed. If desired, the accessing of the track sequential or particular tracks can be selected, such as track 000, followed by track 023, followed by track 085, followed by track 085, followed by track 031, etc. The organization of the data recorded on data surface region 26 is dependent largely by the controller selected. The controller for unit 2 may be of a conventional type, such as one made by Realtec of San Diego, Calif. and sold as product number TCNGEO9. In one embodiment, 350 tracks, each track having 56 sectors with 256 bytes per sector for a total 5,017,600 bytes, will be sued.

When it is desired to remove card 3 from the unit data head 8 is parked on one of the two support surfaces 120, 122 and then motor 92 drives carriage 86 back to the load/unload position at which point push solenoid 126 is actuated. Plunger 127, which passes through gap 128 in abutment edge 80, pushes card 3 until card 3 is engaged by third rollers 48, at this time being rotated in directions opposite of the directions of FIGS. 5B and 6B. Card 3 is then delivered to the user in substantially the position as indicated in FIG. 4B.

In the preferred embodiment data head 8 physically contact data surface region 26 and support surfaces 120, 122. It may be possible to use a so-called flying head in which data head 8 would not contact data surface region 26. However, it is believed that the gaps at edges 28, 30 would create turbulence causing the flying head to crash onto data surface region 26. Also, the invention has been described with reference to magnetic, digitally encoded data. If desired, the data could be analog in nature and could be optical or magneto optical in character.

Figure 11:
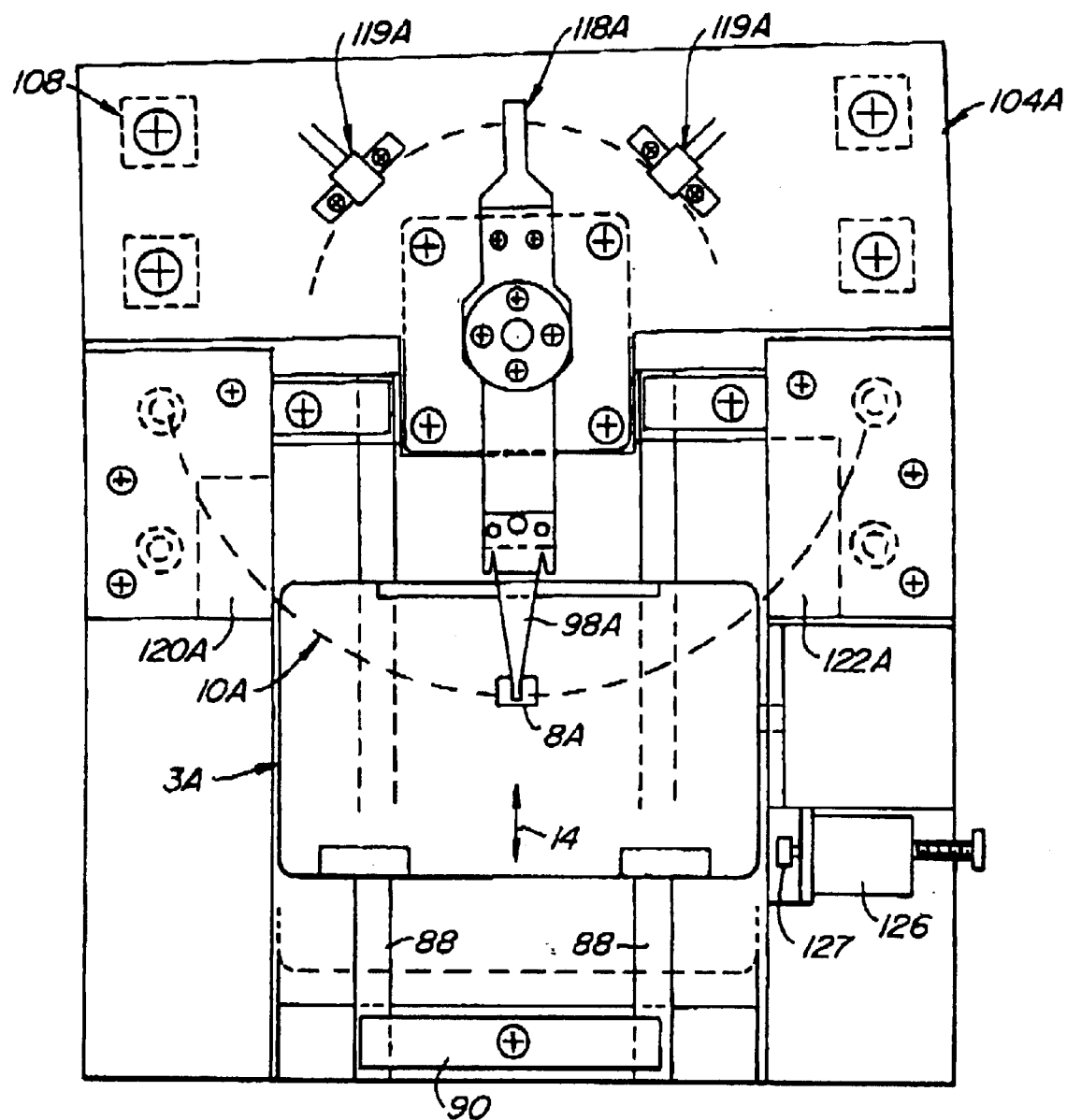
FIG. 11 is a simplified top plan view of a portion of an alternative embodiment of the invention in which the data head is mounted to the end of a pivotal arm which causes the read/write head to pass along an arcuate second path as opposed to the linear second path of the embodiment of FIG. 1.

FIG. 11 illustrates portions of an alternative embodiment of the invention with like reference numerals referring to like elements. In this case, data unit 2A uses an oscillating data head 8A which passes along an arcuate second path 10A. Data head support surfaces 120A, 122A are positioned somewhat differently, but proved the same service: support of data head 8A at each end of its movement. Sensors 119A indicate when data head 8 has passed form data surface region 26A so that data head 8 can begin its deceleration and reverse acceleration movement as card 3A is indexed along first path 14.

It is envisioned that the data card of the present invention would comprise a substrate having first and second edges in a data surface region therebetween. The substrate will include at least one layer comprising a non-magnetic material which is adapted to be relatively rigid and which is to have a magnetic media formed directly on the surface thereof. The non-magnetic material for the substrate may be selected from the group of a metal substrate, a glass substrate, a ceramic substrate, a glass-ceramic substrate and a resin substrate. The substrate may be formed of an at least one layer acting as a single layer or may have outer layers mounted thereto.

A method for reading a data card with a card reader may be used for practicing the invention. The method will include the steps of forming a substrate for a data card having first and second edges and surface region therebetween wherein the substrate includes at least one layer comprising a non-magnetic ceramic material which is adapted to interact with a data processing station when said card and said data processing station are moved relative to each other to at least one of write encoding signals in said data surface section as encoded signals and read encoded signals from said data surface section; and moving said substrate and data processing station relative to each other to interface said data surface region relative to a transducer to enable data flow therebetween.

In addition, a method for reading a data card with a card reader using the teachings of the present invention it is disclosed. The method includes the steps of forming a substrate for a data card having first and second edges and a data surface section location therebetween wherein the substrate includes at least one layer comprising a non-magnetic material selected from the group of a metal substrate, a glass substrate, a ceramic substrate a glass-ceramic substrate and a resin substrate and wherein said data surface region includes a magnetic material for storing data; and moving said data card and data processing station relative to each other to interface said data storage section relative to a transducer to enable data flow therebetween.

It is also within the teaching of the present invention that the surface of the non-magnetic substrate material can be processed, textured or otherwise treated to enhance the adhesion of a magnetic media, such as a nickel-cobalt recording layer.

The recording medium of the present invention has been intentionally designed to be exposed to and to tolerate mechanical degradation of the surface without any degradation of the underlying high coercivity recording layer. The head or transducer operating as the read/write device on medium or data storage device of this invention can either operate in absolute contact with the outer surface of the protective coating or can "fly" in "quasi" contact to 10 microinches above the outer surface of the protective coating.

Figure 12:
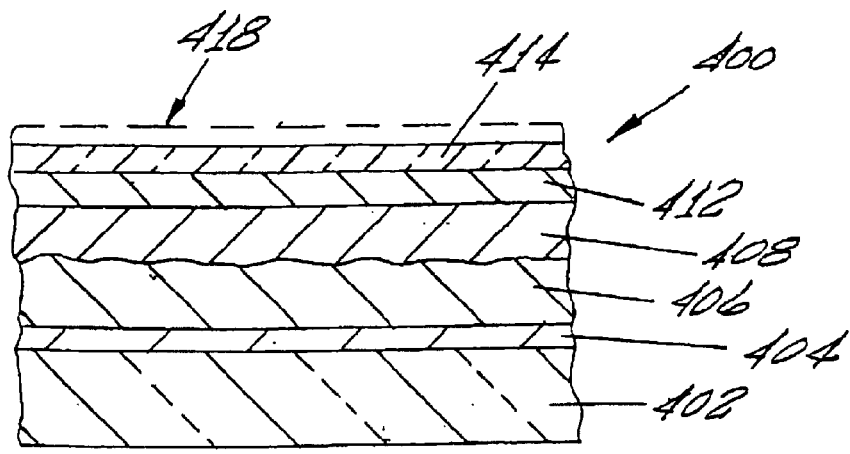
FIG. 12 is a pictorial representation of a prior art recording medium having a high density magnetic material having its axis of magnetization extending in a substantially horizontal direction relative to at least one surface of the substrate, which recording media is used for a data storage device operating in a protective environment, and to which a protective coating as disclosed herein can be added to use the same in a data storage device of the present invention.

FIG. 12 is a pictorial representation of a prior art recording medium 400 having substrate 402, a Ti Seed Layer 404 (having a thickness of approximately 100 Angstroms), a layer 406 of NiP having formed around a layer 408 of Cr, a high density magnetic material layer 412 having its axis of magnetization extending in a substantially horizontal direction relative to at least one surface of the substrate 402, and wherein the layer 412 is coated or sealed with a glass or PLC coating 414. The recording medium 400 is exemplary of the type of recording medium used for a data storage device operating in a protective environment.

The selected thickness and relative hardness of the protective coating permits substantial abrasion due to particulate contamination during read/write operation in a normal ambient atmosphere operating environment as well as during abrasive cleaning, where the outer surface of the protective coating may be abraded. The protective coating has been designed to abrade away upon impact with particulate matter including particles occurring between the head and media and during cleaning and handling leaving the underlying high coercivity recording material intact.

In the present invention, a relatively hard, abradeable protective coating is formed on the magnetic material layer and the selected thickness of the protective layer is an important criteria for rendering this invention operable. The thickness is selected to be between a maximum thickness which would materially attenuate magnetic signals passing between the magnetic material layer and a transducer and a minimum thickness enabling the protective coating to be abraded by usage in an ambient natural atmosphere operating environment for removing therefrom a known quantity of the protective coating.

As such, the protective coating in the preferred embodiment is a bendable, diamond-like hardness protective coating having a selected thickness which allows passage of magnetic signals in an ambient natural atmospheric operating environment through the protective layer and between said at least one high density magnetically coercive material layer and a transducer and is formed of a material which resists at least one of chemical, magnetic and controlled mechanical degradation of the data storage device.

Figure 13:
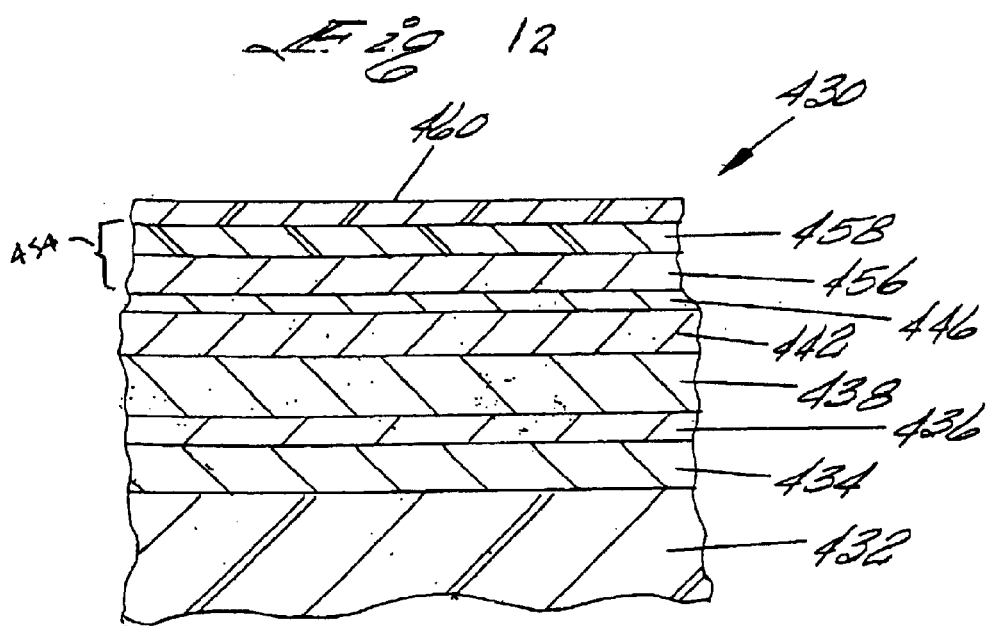
FIG. 13 is a pictorial representation of one embodiment of a recording medium of the present invention having a high density magnetic material having its axis of magnetization extending in a substantially horizontal direction relative to at least one surface of the substrate and a plurality of layers of the materials including a protective coating having a magnetically permeable, low coercivity layer of magnetic material separated by a layer of non-magnetic material defining an exchange break layer which enables a magnetic image field to be stored in the magnetically permeable, low coercivity layer, which recording medium is used for a data storage device.

FIG. 13 is a pictorial representation of one embodiment of a recording medium shown generally as 430 which is formed of a plurality of layers of material to provide the most ideal recording medium possible for practicing this invention. The recording medium 430 has a substrate 432 which functions as the portable card substrate. A base layer 434 is deposited on the substrate 432. A seed layer 436, which may be optional, is deposited on the base layer 434 a layer 438 formed of chromium is deposited on the seed layer 436. A layer 442 of high density magnetic material having its axis of magnetization extending in a substantially horizontal direction relative to at least one surface of the substrate 432 is deposited on the chrome layer 438. A layer 446 of non-magnetic material, which functions as a "break layer", "exchange break layer" or a "decoupling layer", is deposited on the magnetic layer 442. A protective coating shown by bracket 454 is applied to the layer 446. The protective coating 454 is formed of two layers, namely a magnetically permeable, low coercivity layer 460, which is deposited on the layer 446 to form a "keeper" layer, and a second layer 458 which preferably is a hard, diamond like material.

The structure, function and operation of a "keeper" layer and other known prior art relating to a "keeper" layer is described in PCT Application US92/10485 filed Dec. 7, 1992 and published on Jul. 8, 1993.

The protective coating 454 may have formed thereon a bonded lubrication layer 460 which functions as a cleaning material layer permitting the cleaning of debris, fingerprints and other particulate material from the surface of the recording medium 230.

Figure 14:
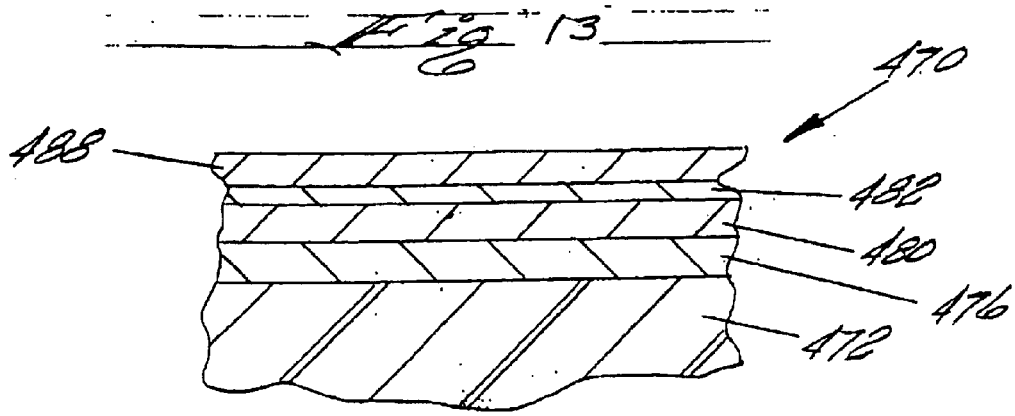
FIG. 14 is a pictorial representation of another embodiment of a recording medium of the present invention having an underlayer deposited on at least one surface of a substrate deposited, a high density magnetic material layer deposited on the underlayer wherein the high density magnetic material has its axis of magnetization extending in a substantially horizontal direction relative to at least one surface of the substrate, a layer of non-magnetic material defining an exchange break layer, and a protective coating including a magnetically permeable, low coercivity layer of magnetic material separated which is separated from the high density magnetic material layer by the exchange break layer which enables a magnetic image field to be stored in the magnetically permeable, low coercivity layer, which recording medium is used for a data storage device.

FIG. 14 is a pictorial representation of another embodiment of a recording medium 470 for practicing this invention. This structure represents a recording medium having a significantly less number of layers of material compared to the embodiment and structure described above in connection with FIG. 13.

A substrate 472, which is used as the portable card, has a chromium underlayer 476 deposited on at least one surface of the substrate 472. A high density magnetic material layer 480 is deposited on the underlayer 476 wherein the high density magnetic material layer 480 has its axis of magnetization extending in a substantially horizontal direction relative to at least one surface of the substrate 472. A layer of non-magnetic material 482 defining an exchange break layer is deposited on the magnetic layer 480. A protective coating 488, which is in the form of a single layer, includes a magnetically permeable, low coercivity magnetic material which is separated from the high density magnetic material layer 480 by the exchange break layer 482 which enables a magnetic image field to be stored in the magnetically permeable, low coercivity magnetic material forming the protective coating 488.

Figures 15A, 15B:
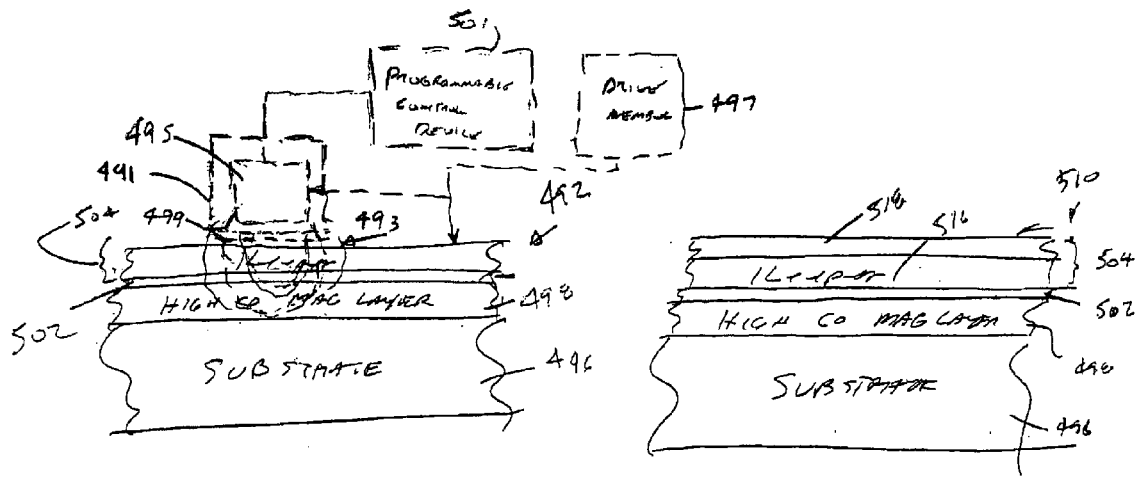
FIG. 15(A) is a pictorial representation of yet another embodiment of a recording medium of the present invention having a high density magnetic material layer deposited on the at least one surface of the substrate wherein the high density magnetic material has its axis of magnetization extending in a substantially horizontal direction relative to at least one surface of the substrate, a layer of non-magnetic material defining an exchange break layer, and a protective coating comprises one layer including a magnetically permeable, low coercivity layer of magnetic material separated which is separated from the high density magnetic material layer by the exchange break layer which enables a magnetic image field to be stored in the magnetically permeable, low coercivity layer, which recording medium is used for a data storage device.
FIG. 15(B) is a pictorial representation of still yet another embodiment of a recording medium of the present invention having a high density magnetic material layer deposited on the at least one surface of the substrate wherein the high density magnetic material has its axis of magnetization extending in a substantially horizontal direction relative to at least one surface of the substrate, a layer of non-magnetic material defining an exchange break layer, and a protective coating comprises two layers wherein one layer comprises a magnetically permeable, low coercivity layer of magnetic material separated which is separated from the high density magnetic material layer by the exchange break layer which enables a magnetic image field to be stored in the magnetically permeable, low coercivity layer and the other layer is disposed on the one layer is formed of a hard, diamond like material, which recording medium is used for a data storage device.

FIG. 15(A) is a pictorial representation of yet another embodiment of a recording medium 492 for practicing this invention. In this embodiment, the protective coating is a single layer and includes a magnetically permeable, low coercivity magnetic material which also functions as the "keeper" layer. The recording medium 492 includes a substrate 496 which is preferable formed of a non-magnetic material. A high density magnetic material layer 498 is deposited on the at least one surface of the substrate 496 wherein the high density magnetic material has its axis of magnetization extending in a substantially horizontal direction relative to at least one surface of the substrate 496. A layer 402 of non-magnetic material, defining an exchange break layer, is deposited on the magnetic layer 498. The protective coating 404 comprises one layer including a magnetically permeable, low coercivity layer of magnetic material which is separated from the high density magnetic material layer 498 by the exchange break layer 402. The exchange break layer 402 enables a magnetic image field to be stored in the magnetically permeable, low coercivity material.

In FIG. 15(A), the recording medium is illustrated to interact with a magnetic control device shown by dashed rectangle 491 having a bias field shown by arrow 493 which is adapted to increase through the protective coating 504 and the and the exchange break layer 502 the reluctance of the magnetic saturable, magnetically permeable material in the protective coating 504 to enable the magnetic signals to pass between the high density magnetically coercive material through the exchange break layer 502 and the protective coating 504 to a magnetic transducer 495.

The magnetic transducer is typically forms part of or is located in a data processing station and is adapted to interact with the portable card containing the data storage device 492 when the portable card and data processing station are moved relative to each other to position the data storage device proximate the data processing station to enable data flow between the magnetic layer in the data storage device and the transducer.

The bias field 493 causes or drives the magnetic saturable, magnetically permeable material in the protective coating 504 into saturation enabling the magnetic signals to easily pass from the magnetic layer 498, through the exchange break layer 302 and the protective coating 504 to the transducer 495. The portion of the protective coating that does have the bias filed 493 applied thereto remains in an unsaturated condition and retains or keeps the magnetic signals encoded in the magnetic layer 498.

A drive member, depicted by rectangle 497, is operatively coupled to at least one of the transducer 295 and the portable card containing the recording medium 492 to provide the relative movement therebetween.

The drive member is used to perform one of the following: (i) position the portable card proximate the data processing station to enable data flow there between; (ii) move the portable card relative to the data processing station; (iii) move the data processing station relative to the portable card; and (iv) the portable card and the data processing station are moved relative to each other.

The transducer 495 maybe be: (i) an inductive head; (ii) a thin film magnetic head; (iii) a magnetoresistive head; (iv) a giant magnetoresistive (GMR) head, and (v) a magnetoresistive head including a dual stripe magnetoresistive element. In addition, the magnetoresistive head may include a magnetic flux guide shown by dashed line 499 in FIG. 15(A) for conducting magnetic flux from the data storage device of the portable card read by such a magnetoresistive head.

In FIG. 15(A), a programmable control device depicted by dashed box 501 is operatively connected to the magnetic control device 491 to cause the bias field 493 to be applied to the recording medium 492 when a selected magnetic image is located substantially adjacent the transducer 495. The use of such a programmable control device is known in the magnetic recording and reproducing art.

Figures 15C, 15D:
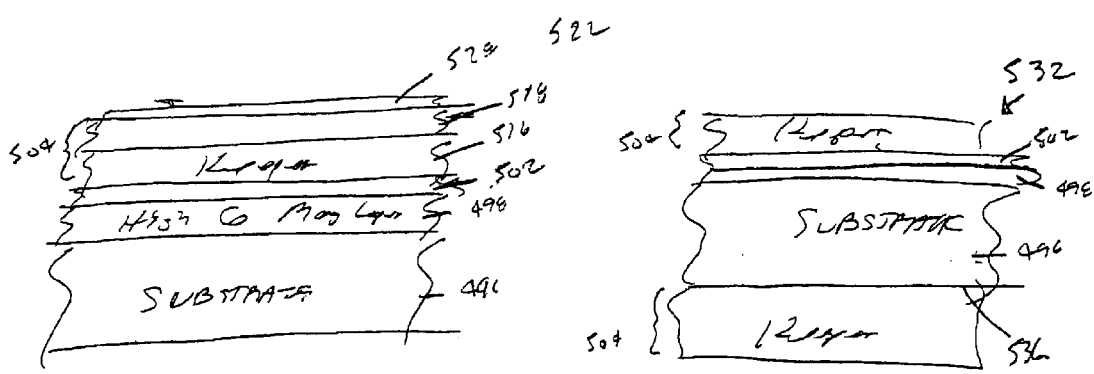
FIG. 15(C) is a pictorial representation of yet another embodiment of a recording medium of the present invention having a high density magnetic material layer deposited on the at least one surface of the substrate wherein the high density magnetic material has its axis of magnetization extending in a substantially horizontal direction relative to at least one surface of the substrate, a layer of non-magnetic material defining an exchange break layer, a protective coating comprising two layers wherein one layer comprises a magnetically permeable, low coercivity layer of magnetic material separated which is separated from the high density magnetic material layer by the exchange break layer which enables a magnetic image field to be stored in the magnetically permeable, low coercivity layer and the other layer is disposed on the one layer is formed of a hard, diamond like material and a layer defining a bonded lubricant formed on the other layer of the protective coating, which recording medium is used for a data storage device.
FIG. 15(D) is a pictorial representation of still yet another embodiment of a recording medium of the present invention having a high density magnetic material layer deposited on the at least one surface of the substrate wherein the high density magnetic material has its axis of magnetization extending in a substantially horizontal direction relative to at least one surface of the substrate, a layer of non-magnetic material defining an exchange break layer, and a protective coating comprises one layer including a magnetically permeable, low coercivity layer of magnetic material separated which is separated from the high density magnetic material layer by the exchange break layer which enables a magnetic image field to be stored in the magnetically permeable, low coercivity layer, and a protection coating formed on the other side of the substrate opposite to the surface having the high density magnetic material layer deposited thereon, which recording medium is used for a data storage device.

FIGS. 15(B), 15(C) and 15(D) are variations of the structure of FIG. 15(A) and the same numbers are used in each figure to identify similar elements for purposes of the following descriptions.

In FIG. 15(B), the structure of the recording medium 510 is substantially the same as that of the recording medium 492 of FIG. 15(A) except that the protective coating 504 is formed of two layers, one layer of which is a "keeper" layer 516 and the other of which is a layer 518 formed preferably of a hard, diamond like material.

In FIG. 15(C), the structure of the recording medium 522 is similar to that of the recording medium 510 of FIG. 15(B) except that an additional layer 428 of a bonded lubricant material is deposited on the layer 518. The bonded lubricant material may be any well known bonded lubricating material applicable for coating onto a recording medium, such as for example perflouroether or phosphozene.

In FIG. 15(D), the structure of the recording medium 532 is similar to that of FIG. 15(A) except that the protective coating 504 is applied to both the recording medium formed on the substrate, which coats one side of the substrate 296, and to the opposite side of the substrate 536.

Tables 2, 3, 4 and 5 set forth below provide examples of the various materials that can be used for various layers of materials as described in the embodiments of FIGS. 13, 14, 15(A), 15(B), 15(C) and 15(D), the thickness thereof and other important characteristics thereof. The examples set forth herein are not intended to be limiting in nature or teachings, but rather are examples of materials that can be used in practicing this invention. It is envisioned that other materials not disclosed herein, but which are known to persons skilled-in-the art, can also be used in practicing the present invention, and such materials as well, as any after developed material that are substantially equivalent to the materials disclosed herein, are deemed to be within or as using the teachings of the present invention.

In an unsaturated state, the magnetic permeable, magnetically saturable material, which may be use alone as protective coating, provides a shunt path that contains substantially all of the magnetic flux from the recorded data in the high coercivity layer. The effectiveness of the protecting coating becomes degraded at a thickness where the material commences to emit a detectable quantity of magnetic flux leakage.

Also, the protective layer minimum thickness due to known quantity of magnetically permeable, magnetically saturable material being removed by usage is that minimum thickness thereof which is capable of supporting magnetic flux density of a reading signal.

It is highly desirable that the magnetic flux from the data stored in the high coercivity magnetic layer is substantially retained in the magnetic permeable protective layer.

Upon application of a localized saturating flux, such as DC bias field, an electrical aperture is created in the magnetic permeable, magnetically saturable layer. The flux lines from a bit cell of data are now unconstrained, e.g., a state of high reluctance, and can extend outside the magnetic permeable protective layer and into interaction with a transducer for detection and subsequent data processing. Flux from all of the other bit cells remain substantially contained in the non-saturated magnetic permeability, magnetically saturable protective coating; e.g. a state of low reluctance. Relative motion between the medium and the transducer will "move" the localized saturated aperture in the magnetic permeable, magnetically saturable layer, forming the protective coating, to permit additional cells of data to be accessible by the read transducer.

In the preferred embodiment where the protective coating is a magnetic permeability, magnetically saturable material, substantial amounts of the magnetic permeable protection layer can be abraded or worn away by sliding transducer contact, by an abrasive cleaning, by removing or slighting abrading as required to remove debris, fingerprints and the like from the card or by rough handling without affecting the integrity of the data stored in the high coercivity data memory layer. In the preferred embodiment, the magnetic permeable protection layer may be formed from a wide variety of low coercivity, high permeability materials, materials typically used as core material in magnetic read/write transducers. Such materials include Permalloy (NiFe), Sendust (AlFeSil) and super Sendust (AlFeSilNi).

The thickness of the magnetic permeable protection layer should be sufficient to retain all of the flux from the high coercivity memory layer with some additional material to permit substantial mechanical wear while still containing the underlying magnetic flux. However, even if nearly all of the magnetic permeable protection layer is worn away to the thickness where a slight amount of flux leakage occurs, some retention of the underlying flux will still occur.

Mechanical damage to the high coercivity layer will not occur as long as some material in the protective layer remains intact. Because of the protective coating of the present invention being so robust and bendable, a very severe grinding action would be required to remove all of the protection layer, exposing the underlying break layer and high coercivity data recording layer.

When a magnetically encodeable card having a protective coating of the present invention is exposed to stray magnetic field, such as adjacent credits cards for example, the magnetic permeability, magnetically saturable material causes the magnetic filed to be captured with the saturable material thereby providing magnetic protection to the material storage layer.

Likewise the relatively hard protective coating, if immersed in a chemical solution or other fluid, which may contain chemicals, the protective coating protects the material storage layer from being degraded by such chemicals which come into contact with the data storage device.

The relatively hard, abradeable protective coating of the present invention is formed on the magnetic material layer. The protective coating is selected to have a thickness between a maximum thickness which would materially attenuate magnetic signals passing between the magnetic material layer and a transducer and a minimum thickness enabling the protective coating to be abraded by usage in an ambient natural atmosphere operating environment for removing therefrom a known quantity of the protective coating. The maximum thickness and minimum thickness can be empirically determined and are generally a function of the data storage device materials, the protective coating materials, the transducer and the like. The protective coating may be a single layer which includes a magnetically permeable, magnetically saturable material or at least two layers wherein one of the layers include a magnetically permeable, magnetically saturable material and the other of the layers may be a non-magnetic friction reducing layer formed on the one of the layers.

The term "diamond-like hardness" is well known in the art and is described in detail at page 599 and pages 629 through 638 in TRIBOLOGY AND MECHANICS OF MAGNETIC STORAGE DEVICES by Bharat Bhushan published by Springer-Verlag of New York. Generally the term diamond-like hardness refers to an amorphous or diamond-like carbon (DLC) deposited by sputtering or plasma-enhanced chemical vapor deposition techniques that has been developed for applications, such as the magnetic thin-film disks, which require extremely low friction, and wear at a range of environmental conditions, e.g. inside the protected environment of the disk drive.

FIG. 15(B) is a pictorial representation of the recording medium 340 of FIG. 15(A) having a plurality of substantially parallel magnetic tracks 346 and illustrating that specific domain areas 348 are used for recording magnetic signals therein.

In FIG. 15(A), the recording medium is illustrated to interact with a magnetic control device shown by dashed rectangle 291 having a bias field shown by arrow 293 which is adapted to increase through the protective coating 304 and the and the exchange break layer 302 the reluctance of the magnetic saturable, magnetically permeable material in the protective coating 304 to enable the magnetic signals to pass between the high density magnetically coercive material through the exchange break layer 302 and the protective coating 304 to a magnetic transducer 295.

The magnetic transducer is typically forms part of or is located in a data processing station and is adapted to interact with the portable card containing the data storage device 292 when the portable card and data processing station are moved relative to each other to position the data storage device proximate the data processing station to enable data flow between the magnetic layer in the data storage device and the transducer.

The bias field 293 causes or drives the magnetic saturable, magnetically permeable material in the protective coating 304 into saturation enabling the magnetic signals to easily pass from the magnetic layer 298, through the exchange break layer 302 and the protective coating 304 to the transducer 295. The portion of the protective coating that does have the bias filed 293 applied thereto remains in an unsaturated condition and retains or keeps the magnetic signals encoded in the magnetic layer 298.

A drive member, depicted by rectangle 297, is operatively coupled to at least one of the transducer 295 and the portable card containing the recording medium 292 to provide the relative movement therebetween.

The drive member is used to perform one of the following: (i) position the portable card proximate the data processing station to enable data flow therebetween; (ii) move the portable card relative to the data processing station; (iii) move the data processing station relative to the portable card; and (iv) the portable card and the data processing station are moved relative to each other.

The transducer 295 maybe be: (i) an inductive head; (ii) a thin film magnetic head; (iii) a magnetoresistive head; (iv) a giant magnetoresistive (GMR) head, and (v) a magnetoresistive head including a dual stripe magnetoresistive element. In addition, the magnetoresistive head may include a magnetic flux guide shown by dashed line 299 in FIG. 40(A) for conducting magnetic flux from the data storage device of the portable card read by such a magnetoresistive head.

In FIG. 40(A), a programmable control device depicted by dashed box 301 is operatively connected to the magnetic control device 291 to cause the bias field 293 to be applied to the recording medium 292 when a selected magnetic image is located substantially adjacent the transducer 295. The use of such a programmable control device is known in the magnetic recording and reproducing art.

Table 2 sets forth materials which can be used for the protective coating, "keeper layer", break layer and magnetic layer:

TABLE 2

| Protective Coating (Overlayer) | "Keeper Layer": | Break Layer | Magnetic Layer |
|---|---|---|---|
| Carbon Diamond Like | AlFeSil (Sendust) | Silicon | CoCrPtTa |
| Carbon Zirconia Zirconia Oxide Glass | NiFe (Permalloy) CoZrNb | Carbon Chromium | CoCrPt CoCrTa CoNiCr CoNiPt CoNiCrPt |

Table 3 sets forth materials which can be used for an Underlayer, Optional seed layer, Optional base layer and card substrate:

TABLE 3

| Underlayer | Optional Seed Layer | Optional Base Layer | Card Substrate |
|---|---|---|---|
| Typically Chromium | Crystalline CrNi Ta Aluminum Nitride CrTiO2 | NiP | Glass Zirconia Plastic Isotropic Plastic Ceramic/Alumina Glass Ceramic Glass Carbon Fiber Stainless Steel Titanium Aluminum Phosphor Bronze |

Table 4 sets forth the range in Angstroms, for the Overcoat thickness, the Keeper thickness, the break layer thickness and magnetic layer thickness, as determined in a direction substantially normal to the surface of the substrate:

TABLE 4

| Protective Coating (Overlayer) Thickness | Keeper layer Thickness | Break Layer Thickness | Magnetic Layer Thickness |
|---|---|---|---|
| 150 Angstroms to 500 Angstroms | 50 to 500 Angstroms | 10 Angstroms to 150 Angstroms | 250 Angstroms to 1000 Angstroms |

Table 5 sets forth the range in Angstroms, for the underlayer thickness, the seed layer thickness, the base layer thickness and card substrate, as determined in a direction substantially normal to the surface of the substrate:

TABLE 5

| Underlayer Thickness | Seed Layer Thickness | Base Layer Thickness | Card Substrate Thickness |
|---|---|---|---|
| 200 Angstroms to 2000 Angstroms | 100 Angstroms to 1000 Angstroms | Typically 10 Micrometers | .005 inches to .050 inches |

The substrate surface may be treated by texturing to enhance orientation of anistropic* materials. The known texturing procedures that can be used include: (i) circumferential texturing; (ii) radial texturing; (iii) chemical texturing; and (iv) laser texturing.

The simplified schematic diagram of FIG. 16 discloses a card reader for reading and reproducing information a portable card utilizing the teachings of the present invention.

The simplified card reader schematic that illustrates that the portable card is inserted into the card reader as depicted by box 600. The card reader is programmed to be in a standby condition as depicted by box 602. When the portable card is inserted into the card reader, the card reader is activated as depicted by box 606. The card reader then performs a self-calibration step as depicted by box 610. The card reader then determines if the format of the portable card is acceptable and this step is depicted by box 612. The portable card and the data processing station located within and forming part of the card reader are moved relative to each other to cause the passage of magnetic signals between the data storage device and a transducer located within the data processing station. The relative movement between the portable card and the data processing station performs the required data transactions as depicted by box 614. To the extent that in the data corrections, recording of data, writing of data and the like, such operations are performed during such relative movement as described above and this step is depicted by box 616.

Upon completion of the data transaction 614 and data correction or other similar operations 616, a decision is made as to how the portable card is to be further processed. To the extent that any additional transactions are required before the portable card is returned to the user, the card reader completes such of the transactions as depicted by box 618. The portable card is then transported to a removable location for removal by the user and this is depicted by box 620. Upon completion of the other transactions as depicted by box 618, the card reader is placed into a standby mode in preparation for the next transaction.

If a decision is made that the data and/or card is damaged and the transaction should be rejected and/or the card is retained, that process step is depicted by box 622. Upon completion of the step depicted by box 622, the card reader is placed into a standby mode in preparation for the next transaction.

As discussed hereinbefore, it is anticipated that the protective coating could be subject to the collection of debris, finger prints or the like from normal handling by a user in an ambient and normal environment, as differentiated form a protected environment required for hard disk drive devices.

Therefore, the accuracy and reliability of reproducing (reading) encoded data from the portable card by a card reading apparatus and/or by methods for processing the portable card can be improved or enhanced by use of a card cleaner and process for cleaning a portable card prior to the card reader processing the portable card.

A protective coating is formed on the at least one thin film layer of high density, high coercivity magnetic material and is selected to have a thickness to facilitate passage of magnetic signals in an ambient natural atmospheric operating environment through the protective coating and the thin film layer. The protective coating may be formed of a material which resists at least one of chemical, magnetic and mechanical degradation of the data storage device. The protective coating is adapted to interface with and be responsive to a data processing station when the substrate and data processing stations are moved relative to each other to enable data flow therebetween.

The at least one thin film layer of high density, high coercivity magnetic material may be a sputtered layer or a platted layer. The transducer may be a thin film magnetic head, a magnetoresistive head or a giant magnetoresistive (GMR) head. The magnetoresistive head may include a dual stripe magnetoresistive element. In addition, the magnetoresistive head may include a magnetic flux guide for conducting magnetic flux from the data storage section of the card read by said reader to the magnetoresistive head.

The data storage section may include data tracks having a predetermined width formed on a selected surface of the card and the predetermined width may be wider than said magnetoresistive head or have a predetermined width in the range of about "1" times to about "2" times wider than the magnetoresistive head.

A method for reading a card with a card reader is disclosed. The method comprises the steps of (a) forming on a substrate of a card a data storage section adapted to interact with a data processing station when the card and the data processing station are moved relative to each other to at least one of encode signals in the data storage section and read encoded signals from the data storage section; (b) forming a relatively hard, abradeable protective coating on said data storage section having a thickness between a maximum thickness which would materially attenuate encoding and encoded signals passing between said data storage section and a transducer and a minimum thickness enabling said protective coating to be abraded by usage in an ambient natural atmosphere operating environment for removing therefrom a known quantity of the protective coating; and (c) moving the card and data processing station relative to each other to interface the data storage section relative to a transducer to enable data flow therebetween. The step of forming may include forming a data storage section having at least one thin film layer of high density, high coercivity magnetic material having a predetermined magnetic field orientation for storing data.

The step of moving may include using a transducer which is a thin film head, a magnetoresistive head or a giant magnetoresistive (GMR) head.

The step of forming may include forming a data storage section having at least one thin film layer of high density, optical recording material which is capable of reading and storing data in optical form. The step of moving may include using a transducer which is a laser adapted to reading and record optical data on the optical recording material.

In the preferred embodiment, a method for reading a card with a card reader may comprise the steps of: (a) forming on a substrate of a non-magnetic material of a card a data storage section including a thin film of magnetic material having a predetermined magnetic orientation for storing data in a predetermined axis; (b) providing a protective coating including a magnetically permeable, magnetically saturable material which is disposed on an exchange break layer and responsive through the exchange break layer to the coercive material axes of magnetization to produce a magnetic image field in a direction opposite to the predetermined direction, the protection coating being formed of a material which resists at least one of chemical, magnetic and controllable mechanical degradation of the magnetic recording medium; and (c) moving the card and data processing station relative to each other to interface the data storage section relative to a transducer to enable data flow therebetween.

Also disclosed is a data storage device comprising a substrate having at least one surface. At least one high density magnetically coercive material layer is disposed on the substrate for storing magnetic signals with the coercive material axis of magnetization oriented in a predetermined direction relative to the at least one surface of the substrate. At least one non-magnetic material layer is disposed on the substrate for defining an exchange break layer. A protective coating is formed on the substrate and is selected to have a depth in a direction substantially normal to said exchange break layer to facilitate passage of magnetic signals in an ambient natural atmospheric operating environment through the exchange break layer and the coercive material having the axis of magnetization in the predetermined direction. The protective layer is formed of a material which resists at least one of chemical, magnetic and mechanical degradation of the data storage device.

The substrate is preferably a non-magnetic substrate and the protective coating includes a magnetically permeable, magnetically saturable storage material disposed on the substrate and which is responsive through the exchange break layer to the coercive material axis of magnetization in the predetermined direction to produce a magnetic image field in a direction opposite to the predetermined direction.

The protective coating may include the magnetically permeable, magnetically saturable storage material as a separate independent layer disposed on the exchange break layer. Optionally, the protective coating may include a non-magnetic abrasion resisting layer as a separate independent layer disposed on the magnetically permeable, magnetically saturable storage material layer.

The at least one high density magnetically coercive material layer is disposed on the substrate for storing magnetic signals with the coercive material axis of magnetization oriented in a predetermined direction relative to the at least one surface of the substrate, and the predetermined direction may be: (i) orientated substantially parallel to said at least one surface of said substrate; (ii) orientated at an acute angle to said at least one surface of the substrate; (iii) orientated substantially perpendicular to the at least one surface of the substrate.

Also disclosed herein is a magnetically encodeable card comprising a non-magnetic substrate having at least one surface having a thin film, high density magnetically coercive material disposed on the substrate for storing magnetic signals with the coercive material axis of magnetization oriented in a predetermined direction relative to the at least on surface of said substrate. A non magnetic material is disposed on the substrate for defining an exchange break layer.

A protective coating is formed on the substrate in a direction substantially normal to the exchange break layer and the protective coating includes a magnetically permeable, magnetically saturable storage material disposed on the substrate and which is responsive through the exchange break layer and the magnetically saturable storage material to the coercive material axis of magnetization to produce a magnetic image field in a direction to facilitate passage of magnetic signals in an ambient natural atmospheric operating environment through the exchange break layer and the magnetically saturable storage material. The protective coating is formed of a material which resists at least one of chemical, magnetic and mechanical degradation of the data storage device.

Alternatively, the protective coating may include the magnetically permeable, magnetically saturable storage material being an independent layer disposed on the substrate. In addition, the protective coating may include a non-magnetic abrasion resisting material as a separate layer disposed on the magnetically permeable, magnetically saturable storage material.

In the magnetically encodeable card, the at least one high density magnetically coercive material layer is disposed on the substrate for storing magnetic signals with the coercive material axis of magnetization oriented in a predetermined direction relative to the at least one surface of the substrate, and the predetermined direction may be: (i) orientated substantially parallel to said at least one surface of said substrate; (ii) orientated at an acute angle to said at least one surface of the substrate; (iii) orientated substantially perpendicular to the at least one surface of the substrate.

The magnetically coercive material has a coercivity, in the preferred embodiment, of at least 1,000 Oersteds and the magnetically permeable, magnetically saturable storage material has a coercivity of less than about 100 Oersteds.

A magnetic signal processing apparatus is disclosed comprising a magnetic recording medium having a high density magnetically coercive material for storing magnetic signals with the coercive material axes of magnetization oriented in a predetermined direction; a non-magnetic material disposed on the high density magnetically coercive material for defining a exchange break layer and a protective coating which includes a magnetically permeable, magnetically saturable material which is disposed on the exchange break layer and which is responsive through the exchange break layer to the coercive material axes of magnetization to produce a magnetic image field in a direction opposite to the predetermined direction. The protective coating is formed of a material which resists at least one of chemical, magnetic and mechanical degradation of the magnetic recording medium.

The apparatus includes a magnetic transducer positioned relative to a surface of the recording medium for transferring signals with respect to the recording medium. A drive member is operatively coupled to at least one of the transducer and the recording medium to provide relative movement therebetween. A magnetic control device having a bias field adapted to increase, through the protective coating and the exchange break layer, the reluctance of the magnetic saturable, magnetically permeable material to enable a magnetic signal to pass between the high density magnetically coercive material through the exchange break layer and the protective coating to the magnetic transducer.

A method of processing magnetic signals using a magnetic recording medium having a high density magnetically coercive material for storing magnetic signals with the coercive material axes of magnetization oriented in a predetermined direction is disclosed. The method comprises the steps of: (a) providing a layer of a non-magnetic material disposed on said high density magnetically coercive material for defining a exchange break layer; (b) providing a protective coating including a magnetically permeable, magnetically saturable material which is disposed on the exchange break layer and responsive through the exchange break layer to the coercive material axes of magnetization to produce a magnetic image field in a direction opposite to the predetermined direction. The protective coating is formed of a material which resists at least one of chemical, magnetic and mechanical degradation of the magnetic recording medium; and (c) generating with a magnetic control device having a bias field adapted to increase through the protective coating and the exchange break layer the reluctance of the magnetic saturable, magnetically permeable material to enable the magnetic signal to pass between the high density magnetically coercive material through the exchange break layer and the protective coating to a magnetic transducer.

A system is disclosed which comprises a magnetic recording medium having a high density magnetically coercive material for storing magnetic signals with the coercive material axes of magnetization oriented in a predetermined direction. A non-magnetic material is disposed on the high density magnetically coercive material for defining a exchange break layer. A protective coating including a magnetically permeable, magnetically saturable material disposed on the exchange break layer and which is responsive through the exchange break layer to the coercive material axes of magnetization to produce a magnetic image field in a direction opposite to the predetermined direction. The protective coating is formed of a material which resists at least one of chemical, magnetic and mechanical degradation of the magnetic recording medium.

A magnetic transducer is positioned relative to a surface of the recording medium for transferring signals with respect to the recording medium. A drive member is operatively coupled to at least one of the transducer and the recording medium to provide relative movement therebetween.

A magnetic control device having a bias field adapted to increase through the protective coating and the exchange break layer the reluctance of the magnetic saturable, magnetically permeable material to enable the magnetic signal to pass between the high density magnetically coercive material through the exchange break layer and the protective coating to the magnetic transducer.

A programmable control device operatively connected to the magnetic control device is used to cause the bias field to be applied to the recording medium when a selected magnetic image is located substantially adjacent the transducer.

The protective coating may have at least one layer which includes a magnetically permeable, magnetically saturable storage material. Alternatively, the protective coating may have at least two layers wherein one of the layers includes a magnetically permeable, magnetically saturable storage material and the other of the layers is a non-magnetic abrasion resisting layer formed on the one of the layers.

The data storage device may further include a non-magnetic material layer positioned between the protective coating and the at least one thin film layer. The magnetically permeable, magnetically saturable storage material is responsive through the non-magnetic layer to the coercive material axis of magnetization in the predetermine direction to produce a magnetic image field in a direction opposite to the predetermined direction.

Alternatively, the protective coating may have at least two layers wherein one of the layers includes a magnetically permeable, magnetically saturable storage material and the other of the layers is a non-magnetic abrasion resisting layer formed on the one of the layers.

In such a device, the data storage device may further includes a non-magnetic material layer positioned between the one of the layers of the protective coating and the at least one thin film layer and wherein the magnetically permeable, magnetically saturable storage material is responsive through the non-magnetic layer to the coercive material axis of magnetization in the predetermine direction to produce a magnetic image field in a direction opposite to the predetermined direction.

The portable card utilizing the teachings of the present invention has wide and multiple applications and is essentially a multi-use portable card having a data storage device. As such, the data storage device in the form of a portable card can be utilized for either or both, either solely or jointly, as a financial or credit card, and/or for non-financial data storage and/or any other transaction type card requiring the storing of magnetic signals.

For magnetically encodeable cards, portable cards, data cards or other cards or the like employing the teaching of the present invention for use with magnetics, the present invention may be practiced with a wide variety of horizontal or vertical recording materials, soft magnetic materials, non-magnetic materials and substrates. In addition conventional deposition, sputtering, plating, oxidating and web coating methods may be employed to prepare the recording medium or data storage section, or a data storage section combined with a substrate to from a data storage device, or data storage device. Media used for hard disks, floppy disks and recording mediums when used with the protective coating of the present invention may be used for practicing this invention. Further, the above-described advantages may be achieved by the addition of a relatively hard, bendable protective coating to the data storage device that can yield with movement of the card and wherein it is anticipated that a predetermined quantity of the protective coating will be abraded therefrom during normal use in an ambient normal atmospheric operating or usage environment.

The storage material which can be sued for practicing this invention include, without limitation: (i) magnetic material; optical recording material; and (iii) magneto-optical material. Such material are well known to persons skilled-in-the art, and they need not be discussed in detail herein.

All such variations and incorporating of the teachings of the present invention are envisioned to be covered by and anticipated by the teachings set forth herein.

Other modifications and variation can be made to the disclosed embodiments without departing from the subject of the invention as defined in the following claims.

What is claimed is:

1. A data unit comprising:
   a data card comprising
      a non-magnetic substrate and a magnetic material layer for storing signals in a plurality of parallel linear data tracks;
   a data card reader comprising
      a data head reciprocally movable along a first linear path that is parallel to the plurality of parallel linear data tracks when the plurality of parallel linear data tracks are respectively positioned for signal communication with the data head.

2. The data unit of claim 1, wherein the data card reader further comprises a cleaning roller for cleaning the data card.

3. The data unit of claim 1, wherein the data card reader further comprises a means for cleaning the data card.

4. The data unit of claim 1, wherein the data card reader further comprises a data card cleaner.

5. The data unit of claim 1, wherein the data head contacts the data card during the signal communication.

6. The data unit of claim 1, wherein said magnetic material layer comprises a thin film layer of high density, high coercivity magnetic material.

7. The data unit of claim 6, wherein the data card further comprises an abradeable protective coating over the magnetic material layer.

8. The data unit of claim 7, wherein said protective coating comprises at least two layers, wherein one of said layers includes a magnetically permeable, magnetically saturable material and another of said layers is a non-magnetic friction reducing layer formed over the magnetically permeable, magnetically saturable material.

9. The data unit of claim 8, wherein the data card further comprises a non-magnetic material layer positioned between the protective coating and said at least one magnetic material layer, said magnetically permeable, magnetically saturable material being responsive through said non-magnetic layer to produce a magnetic image field.

10. The data unit of claim 7, wherein said protective coating comprises a magnetically permeable, magnetically saturable material.

11. The data unit of claim 10, wherein the data card further comprises a non-magnetic material layer positioned between the protective coating and said at least one magnetic material layer, said magnetically permeable, magnetically saturable material being responsive through said non-magnetic layer to produce a magnetic image field.

12. The data unit of claim 7, wherein the data card reader further comprises a data card cleaner.

13. The data unit of claim 1, wherein the data head is a flying head.

14. A data unit for communicating signals with a data card including magnetic material for storing signals, said data unit comprising:
   a support that secures the data card during said communicating of the signals; and
   a data head operable to communicate the signals with the magnetic material,
   wherein a first relative movement of the data head and the magnetic material causes the data head to be positioned over a first linear data track in the magnetic material, so that said signals can be communicated between the data head and the first linear data track during a first linear movement of the data head parallel to the first linear data track, and
   wherein a subsequent second relative movement of the data head and the magnetic material causes the data head to be positioned over a second linear data track in the magnetic material, the second linear data track being parallel to the first linear data track, so that said signals can be communicated between the data head and the second linear data track during a second linear movement of the data head parallel to the second linear data track.

15. The data unit of claim 14, wherein said magnetic material comprises a thin film layer of high density, high coercivity magnetic material.

16. The data unit of claim 15, wherein the data card further comprises a protective coating over the magnetic material.

17. The data unit of claim 15, wherein said protective coating comprises at least two layers, wherein one of said layers includes a magnetically permeable, magnetically saturable material and another of said layers is a non-magnetic friction reducing layer formed over the magnetically permeable, magnetically saturable material.

18. The data unit of claim 17, wherein the data card further comprises a non-magnetic material layer positioned between the protective coating and said magnetic material, said magnetically permeable, magnetically saturable material being responsive through said non-magnetic layer to produce a magnetic image field.

19. The data unit of claim 15, wherein said protective coating comprises a magnetically permeable, magnetically saturable material.

20. The data unit of claim 19, wherein the data card further comprises a non-magnetic material layer positioned between the protective coating and said magnetic material, said magnetically permeable, magnetically saturable material being responsive through said non-magnetic layer to produce a magnetic image field.

* * * * *